(12) United States Patent
Keenan

(10) Patent No.: US 12,502,116 B2
(45) Date of Patent: Dec. 23, 2025

(54) SYSTEM AND METHOD FOR OPTIMAL SENSOR PLACEMENT AND SIGNAL QUALITY FOR MONITORING MATERNAL AND FETAL ACTIVITIES

(71) Applicant: KALI Healthcare Pty Ltd, Victoria (AU)

(72) Inventor: Emerson Nucifora Keenan, Victoria (AU)

(73) Assignee: KALI Healthcare Pty Ltd, Victoria (AU)

( * ) Notice: Subject to any disclaimer, the term of this patent is extended or adjusted under 35 U.S.C. 154(b) by 341 days.

(21) Appl. No.: 17/928,864

(22) PCT Filed: Jun. 4, 2021

(86) PCT No.: PCT/AU2021/050560
§ 371 (c)(1),
(2) Date: Nov. 30, 2022

(87) PCT Pub. No.: WO2021/243420
PCT Pub. Date: Dec. 9, 2021

(65) Prior Publication Data
US 2023/0218219 A1  Jul. 13, 2023

(30) Foreign Application Priority Data
Jun. 5, 2020  (AU) ............................... 2020901851

(51) Int. Cl.
*A61B 5/282* (2021.01)
*A61B 5/00* (2006.01)
*A61B 5/344* (2021.01)

(52) U.S. Cl.
CPC .............. *A61B 5/282* (2021.01); *A61B 5/344* (2021.01); *A61B 5/6833* (2013.01); *A61B 2562/166* (2013.01)

(58) Field of Classification Search
None
See application file for complete search history.

(56) References Cited

U.S. PATENT DOCUMENTS 5,636,870 A * 6/1997 Enhorning ............. B42D 15/00
283/67
9,560,975 B2  2/2017 Mei et al.
(Continued)

FOREIGN PATENT DOCUMENTS

CN  105748104 A  7/2016
CN  111407315 A  7/2020
(Continued)

OTHER PUBLICATIONS

International Search Report and Written Opinion for PCT/AU2021/050560 mailed dated Aug. 12, 2021, 10 pages.
(Continued)

*Primary Examiner* — Carl H Layno
*Assistant Examiner* — Manolis Pahakis
(74) *Attorney, Agent, or Firm* — Blank Rome LLP

(57) ABSTRACT

A system for achieving optimal sensor placement and enhanced signal quality for monitoring maternal and fetal activities is disclosed. The system includes a monitoring device and a computing unit. The monitoring device is configured for monitoring maternal and fetal activities and providing guidance to the user via the computing unit upon detecting a feature of interest. The monitoring device includes a plurality of sensors, a data acquisition and transmission unit, one or more reference electrodes, and a ground electrode. Based on personal data acquired using the computing unit, the system utilizes a statistical or machine learning model which incorporates one or more subsets of the personal data to determine the optimal sensor placement close to the fetal heart position. Following sensor placement, the monitoring device performs a signal quality assessment
(Continued)

and selects the optimal sensors to ensure reliable information on maternal and fetal activities is obtained.

16 Claims, 15 Drawing Sheets

(56) References Cited

U.S. PATENT DOCUMENTS

| | | | |
|---|---|---|---|
| 10,898,097 B2 | 1/2021 | Hayes-Gill et al. | |
| 11,207,025 B1 | 12/2021 | Martin et al. | |
| 2005/0267376 A1* | 12/2005 | Marossero | A61B 5/349 |
| | | | 600/511 |
| 2005/0267377 A1* | 12/2005 | Marossero | A61B 5/02411 |
| | | | 128/920 |
| 2006/0189882 A1* | 8/2006 | Thomas | A61B 5/7203 |
| | | | 600/546 |
| 2007/0260133 A1 | 11/2007 | Meyer | |
| 2008/0249390 A1 | 10/2008 | McIntire et al. | |
| 2009/0177101 A1* | 7/2009 | Hersh | A61B 5/4362 |
| | | | 600/511 |
| 2009/0182242 A1* | 7/2009 | Moses | A61B 5/4362 |
| | | | 600/511 |
| 2009/0209874 A1* | 8/2009 | Kolluri | A61B 5/344 |
| | | | 600/511 |
| 2009/0259133 A1* | 10/2009 | Wolfberg | A61B 5/412 |
| | | | 600/511 |
| 2009/0299212 A1* | 12/2009 | Principe | G16Z 99/00 |
| | | | 600/588 |
| 2010/0076330 A1* | 3/2010 | Kimura | A61B 5/4362 |
| | | | 600/511 |
| 2010/0088915 A1* | 4/2010 | Neff | G01B 3/1003 |
| | | | 33/771 |
| 2011/0306862 A1 | 12/2011 | Hayes-Gill et al. | |
| 2012/0139734 A1 | 6/2012 | Olde et al. | |
| 2013/0310701 A1* | 11/2013 | Kobayashi | A61B 5/7235 |
| | | | 600/511 |
| 2016/0128594 A1* | 5/2016 | Amir | A61B 5/14542 |
| | | | 600/382 |
| 2017/0156594 A1 | 6/2017 | Stivoric et al. | |
| 2018/0000405 A1 | 1/2018 | Penders et al. | |
| 2018/0184902 A1 | 7/2018 | Meyerson | |
| 2018/0317783 A1* | 11/2018 | Petrikovsky | A61B 5/02411 |
| 2020/0155000 A1 | 5/2020 | Du et al. | |
| 2021/0267570 A1* | 9/2021 | Ulman | G06T 5/40 |
| 2021/0386198 A1* | 12/2021 | Clouse | G01K 1/14 |
| 2022/0133200 A1 | 5/2022 | Mattila et al. | |
| 2023/0083795 A1 | 3/2023 | O'Grady et al. | |

FOREIGN PATENT DOCUMENTS

| | | |
|---|---|---|
| EP | 3101712 A1 | 12/2016 |
| EP | 4144403 A1 | 3/2023 |
| WO | WO2005117692 A2 | 12/2005 |
| WO | 2007095455 A2 | 8/2007 |
| WO | 2015179322 A2 | 11/2015 |
| WO | WO2017148881 A1 | 9/2017 |
| WO | 2019016759 A1 | 1/2019 |
| WO | 2019119045 A1 | 6/2019 |
| WO | WO2020167256 A1 | 8/2020 |
| WO | 2021130683 A1 | 7/2021 |

OTHER PUBLICATIONS

Written Opinion for PCT/AU2024/051123 dated Jan. 23, 2025, 10 pages.

* cited by examiner

SYSTEM AND METHOD FOR OPTIMAL SENSOR PLACEMENT AND SIGNAL QUALITY FOR MONITORING MATERNAL AND FETAL ACTIVITIES

FIELD OF TECHNOLOGY

The present disclosure generally relates to monitoring of maternal and fetal activities and more particularly to a system and method for achieving optimal sensor placement and enhanced signal quality for monitoring biological data associated with maternal and fetal activities.

BACKGROUND

During pregnancy, maternal and fetal well-being are typically monitored by assessing signals associated with maternal heart rate (MHR), fetal heart rate (FHR), uterine contractions and/or fetal movements. These signals provide diagnostic utility as during periods of maternal or fetal stress, characteristic changes may be observed in the maternal and/or fetal heart rate, uterine contractions, and fetal movement patterns.

In practice, a plurality of devices, systems, and associated methods are available for monitoring maternal and fetal activities, with Doppler ultrasound being the most commonly used method for monitoring FHR and fetal movements. Conventional ultrasonic systems also typically measure uterine contractions using a separate sensor known as a tocodynamometer. When used in combination for measuring heart rate and uterine contractions, these systems are referred to as ultrasound based cardiotocography (CTG) systems.

However, conventional ultrasound based CTG systems have several drawbacks as they must be mechanically directed by a trained professional, resulting in signal loss when not correctly placed over the maternal abdomen. This is particularly disadvantageous for long term FHR monitoring as the ultrasound transducer must be frequently adjusted due to changes in fetal position inside the mother's womb.

To enable long-term monitoring of FHR, devices based on analyzing biological data from alternative sensor modalities placed on the maternal abdomen have been previously proposed. One such technique, known as non-invasive fetal electrocardiography (NI-FECG), utilizes electrical signals recorded from the maternal abdomen to assess fetal well-being. However, existing NI-FECG devices and those based on other sensor modalities have exhibited poor performance when used in an unsupervised setting. Moreover, these devices do not provide a method for obtaining optimal sensor placement and enhanced signal quality for monitoring maternal and fetal activities, and are unable to assess the context of device use, and lack the ability to provide guidance to a user during device operation.

Existing maternal and fetal monitoring devices are not user friendly and have shown poor reliability for continuously measuring the FHR in an unsupervised setting. The poor FHR detection likely stems from a weak amplitude fetal signal coupled with interference from the mother and environment. This has prevented existing devices from being utilised to provide continuous monitoring of fetal distress.

SUMMARY

This summary is provided to introduce concepts of the subject matter in a simple manner that is further described in the detailed description of the disclosure. This summary is not intended to identify key or essential inventive concepts of the subject matter nor is it intended to determine the scope of the disclosure.

In order to solve at least one of the problems mentioned above, the present disclosure discloses a method for providing instructions to the user for placing sensors at optimal positions for monitoring maternal and fetal activities throughout pregnancy. The term optimal as used herein is intended to mean the best possible, most favourable or desirable position under the given circumstances at the time of operation. The circumstances may include the position, posture or activity of the maternal subject, environmental conditions such as humidity for example, and presence of electrical interferences, and so on. It is preferable to have a monitoring device that provides the ability to dynamically assess signal quality of biological data (for example, electrical activity and/or acoustic activity, electromagnetic spectra, movement, temperature and humidity) and determine an optimal sensor placement to maximize fetal signal strength. It is preferable to have a monitoring device configured for providing guidance to the user upon detecting feature(s) of interest in signals recorded via the sensors embedded therein.

Briefly, according to an exemplary embodiment, a monitoring device for dynamically measuring biological data associated with maternal and fetal activities is disclosed. The biological data may include one or more signals associated with electrical activity and/or acoustic activity, electromagnetic spectra, movement, temperature and humidity. The monitoring device includes a plurality of sensors arranged in a pre-determined layout forming a sensor array, a data acquisition and transmission unit, one or more reference electrodes, and a ground electrode. The plurality of the sensors, reference electrodes and ground electrode are coupled with the data acquisition and transmission unit via a cable or any other communication medium. In addition, the monitoring device has an adhesive patch on its rear face such that the monitoring device does not displace from its position when placed on a maternal abdomen. The sensors are configured for dynamically measuring the biological data associated with maternal and fetal activities. The monitoring device captures the sensed signals and performs processing before transmitting data to a computing unit, for example a computer, a phone or tablet, and the like.

Briefly, according to an exemplary embodiment, a system for achieving optimal sensor placement and enhanced signal quality for monitoring maternal and fetal activities is disclosed. The system includes a monitoring device and a computing unit. The monitoring device is configured for monitoring fetal and maternal activities and providing guidance to the user via the computing unit upon detecting feature(s) of interest. The monitoring device includes a plurality of sensors, a data acquisition and transmission unit, one or more reference electrodes, and a ground electrode. Each of the plurality of the sensors are coupled to the data acquisition and transmission unit via a cable or any other communication medium. The computing unit is communicatively coupled with the monitoring device, and includes an application installed, with a user interface that allows capturing personal data of the user, for example, maternal height, maternal weight, uterus width, abdominal width, abdominal depth, abdominal circumference, symphysiofundal height, symphysis to umbilicus distance, umbilicus to xiphisternum distance or midline to fundus distance, and the like. This data can be captured via user input or another source connected to the computing unit such as a camera, microphone, touch screen or connected peripheral device such as a portable ultrasound, a blood pressure monitor, a medical imaging device, and the like. Based on the captured personal data and historical data, the system uses a statistical or machine learning model and one or more subsets of the above-said personal data to determine the optimal placement of a sensor array close to the fetal heart position. The model calculates and provides the position, at which the sensor array of a monitoring device should be placed, to the user. The calculated position and an image of the monitoring device are displayed on the screen of the computing unit to guide the user in placing the monitoring device. In addition, the monitoring device is configured to encode, transmit, and process the data associated with the sensors to determine maternal and fetal electrocardiography (ECG) waveform characteristics, maternal heart rate, fetal heart rate, uterine contractions, and the like. Moreover, the system provides a means for assessing the signal quality of biological data and providing guidance to the user in the form of text, a symbol, a sound, a vibration, an image, a video, an electromagnetic signal, and the like.

Briefly, according to an embodiment, a process for determining optimal placement of a monitoring device of a system on a maternal subject's abdomen for enhancing signal quality for monitoring maternal and fetal activities is disclosed. The process includes the steps of training and deploying at least one model for determining optimal sensor placement on a maternal abdomen. The model may be a statistical model, a machine learning model, or a combination thereof. The model works based on captured personal data and historical data. The process also includes determining placement of an initial sensor array on the maternal abdomen. The initial sensor array may include a plurality of sensors. In the process signals are acquired using the initial sensor array and filtered using low, high, or bandpass filtering. Further steps of the process include assessing the signal quality of the filtered signals to determine one or more optimal sensors from the plurality of sensors and checking a status of guidance to the user by comparing an obtained feature with a predefined threshold. The process further includes providing instructions through a computing device of the system to the user for placement of the monitoring device on the maternal abdomen at a determined position for improving signal quality. The process may use an application installed in the computing unit of the system and execute the application based on the model and one or more subsets of a captured personal data, to provide the instructions to the user.

The above summary is illustrative only and is not intended to be in any way limiting. In addition to the illustrative aspects, example embodiments, and features described above, further aspects, example embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein.

Figure 1:
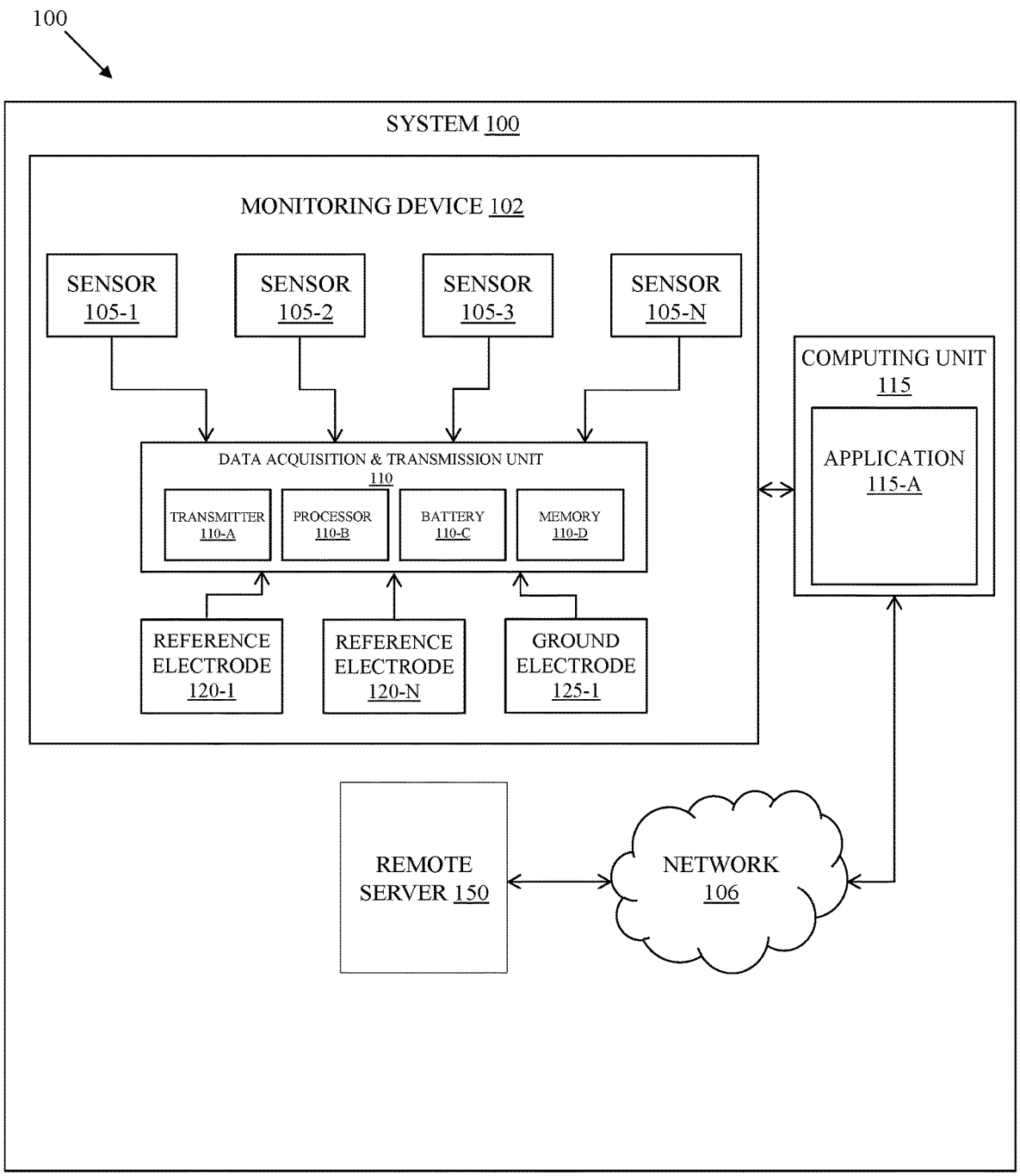
FIG. 1 illustrates a block diagram of a system configured for monitoring maternal and fetal activities, with functionality for achieving optimal sensor placement and enhanced signal quality for monitoring biological data associated with maternal and fetal activities, and providing guidance to the user, in accordance with an embodiment of the present disclosure.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion such that a process or method that comprises a list of steps does not comprise only those steps but may comprise other steps not expressly listed or inherent to such a process or a method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

In the present embodiment of the disclosure, a system for achieving optimal sensor placement and enhanced signal quality for non-invasive fetal electrocardiography is disclosed. The system includes a monitoring device and a computing unit. The monitoring device is configured for monitoring fetal and maternal activities and providing guidance to the user upon detecting a feature of interest. The monitoring device includes a plurality of sensors for measuring electrical activity and/or acoustic activity, electromagnetic spectra, movement, temperature, and humidity, arranged in a predetermined layout, a data acquisition and transmission unit, one or more reference electrodes, and a ground electrode. Each of the plurality of the sensors is coupled to the data acquisition and transmission unit via a cable or any other communication medium. The computing unit is communicatively coupled with the monitoring device and includes an application with a user interface that allows personal data to be captured via a user input or another source connected to the computing unit such as a camera, microphone, touch screen or connected peripheral device such as a portable ultrasound, a blood pressure monitor, a medical imaging device, and the like. Based on the personal data, the system is configured to use a machine learning model that determines the optimal placement of the sensor close to the fetal heart position. The device is configured to encode, transmit, and process the data sensed by the sensors to determine maternal and fetal electrocardiography (ECG) waveform characteristics, maternal heart rate, fetal heart rate, uterine contractions and the like. The system also provides a means for assessing the signal quality of each sensor and providing guidance to the user.

FIG. 1 illustrates a block diagram of a system 100 configured for monitoring maternal and fetal activities, with functionality for achieving optimal sensor placement and enhanced signal quality for monitoring biological data associated with maternal and fetal activities, and providing guidance to the user, in accordance with an embodiment of the present disclosure. The system 100 includes a monitoring device 102, a computing unit 115, a network 106 and a remote server 150. Each block of the system 100 is described in detail below.

The monitoring device 102 is configured for monitoring fetal and maternal activities and providing guidance to the user upon detecting feature(s) of interest. The monitoring device 102 includes plurality of sensors 105-1 through 105-N, a data acquisition and transmission unit 110, one or more reference electrodes 120-1 through 120-N, and a ground electrode 125-1. The data acquisition and transmission unit 110 includes a transmitter 110-A, a processor 110-B, a battery 110-C, and memory 110-D. The transmitter 110-A is configured for transmitting data related to maternal and fetal activities to the computing unit 115. The processor 110-B is configured for processing the sensed data associated with the maternal and fetal activities before transmitting to the computing unit 115. The memory 110-D is configured to store data on the device 102 or act as a buffer before being communicating data to the transmitter 110-A. Processing is performed on the sensed data to determine maternal and fetal electrocardiography (ECG) waveform characteristics, maternal heart rate, fetal heart rate, uterine contractions and the like. The battery 110-C is configured for supplying power to the monitoring device 102.

In one embodiment of the present disclosure, the plurality of the sensors 105-1 through 105-N are configured for measuring biological electrical activity and one or more signal modalities, for example acoustic activity, electromagnetic spectra, movement, temperature or humidity of a maternal and a fetus. Each of the plurality of the sensors 105-1 through 105-N, one or more reference electrodes 120-1 through 120-N, and a ground electrode 125-1 are arranged in the form of a sensor layout. The sensor layout, which forms part of the monitoring device 102, is based on the typical arrangement of maternal-fetal anatomy (that is to say; maternal anatomic landmarks in relation to fetal heart position and common fetal positions and orientations).

The plurality of the sensors 105-1 through 105-N, one or more reference electrodes 120-1 through 120-N, and a ground electrode 125-1 embedded in the monitoring device 102 may be referred to as a sensor array. The sensor array is embedded in either a rigid or a flexible substrate as per a defined layout. The primary sensors for measuring electrical activity in this sensor array preferably consist of silver/silver-chloride (Ag/Ag—Cl) electrodes connected to a printed circuit board (PCB) via wires or embedded in a flexible material such as polyethylene terephthalate (PET), thermoplastic polyurethane (TPU) or similar polymer with flexible conductive traces printed on polymer film. In some embodiments, the sensor array may also take the form of dry or textile-based electrodes comprised of graphene, silver or other conductive materials interwoven with or coated on traditional fibres such as cotton, nylon, polypropylene, and the like. In some embodiments, the sensor array may take the form of an 'electronic tattoo' composed of layers of gold, polyethylene terephthalate (PET), thermoplastic polyurethane (TPU) or similar polymer, chromium (CR) and adhesive, providing a soft conformable surface for skin coupling.

In the same embodiment, the signals measured by the sensors 105-1 through 105-N, one or more reference electrodes 120-1 through 120-N and ground electrode 125-1 are optionally protected by an active shielding system which surrounds each sensor signal with one of the following actively driven signals, for example: 1) the common bias signal calculated across one or more measurement channels, 2) an active ground or 3) a voltage buffered signal from each individual channel.

In the same embodiment, the plurality of the sensors 105-1 through 105-N, one or more reference electrodes 120-1 through 120-N, and ground electrode 125-1 are electrically coupled with the data acquisition and transmission unit 110. Each of the plurality of the sensors 105-1 through 105-N, one or more reference electrodes 120-1 through 120-N, and ground electrode 125-1 are connected with the data acquisition and transmission unit 110 via a cable or any other communication medium. The data acquisition and transmission unit 110 is placed over the maternal abdomen configured for acquiring signals/data related to fetal heart rate, fetal position, uterine contractions, maternal heart rate signal, maternal movement, and the like. The signals/data acquired by the data acquisition and transmission unit 110 are encoded, transmitted, and processed before transmitting data to a nearby computing unit 115 such as a computer, phone, or tablet.

The monitoring device 102 of the system 100 includes the one or more reference electrodes 120-1 through 120-N and the ground electrode 125-1. As mentioned earlier, the one or more reference electrodes 120-1 through 120-N and the ground electrode 125-1 are also coupled with the data acquisition and transmission unit 110. The one or more reference electrodes 120-1 through 120-N provide an ability to assess signal quality across the one or more reference electrodes 120-1 through 120-N and multiplex the optimal reference electrode for signal acquisition. In one embodiment, the ground electrode 125-1 is positioned in between the reference electrodes 120-1 through 120-N. In another embodiment, the ground electrode 125-1 position may be swapped with one of the reference electrodes 120-1 through 120-N.

The system 100 includes the computing unit 115. The computing unit 115 is communicatively coupled to the monitoring device 102 and includes an application 115-A. In one example, the application 115-A may be a mobile application, most commonly referred to as an app, which is a type of application software configured to run on a computing device such as mobile device, such as a smartphone or tablet computer. The application however is not restricted to run on a smartphone or tablet and may be configured to run on a laptop, desktop, or any other computing device. The method as described in the present disclosure may be developed to be embedded within an application 115-A that may provide instructions to the user to undertake a sensor placement process to ensure optimal signal quality for monitoring maternal and fetal activities. Further, the application 115-A installed may enable the computing device 115 to communicate with other computing devices, such as web servers, remote servers (for example as shown by reference numeral 150), and external data servers via a network 106. The external servers may include a memory coupled to a processor. The memory may store a plurality of modules to be executed by the processor. The plurality of modules may be configured for implementing statistical or machine learning models for determining optimal sensor placement on the maternal abdomen, based on captured personal data.

Examples of the computing unit 115 include, but are not limited to, a mobile phone, a computer, a tablet, a laptop, a palmtop, a handheld device, a telecommunication device, a personal digital assistant (PDA), a smart watch, an embedded computing device, an edge device, and the like. The application 115-A provides a graphical user interface that allows personal data to be captured via user input or another source connected to the computing unit such as a camera, microphone, touch screen, or a peripheral device connected temporarily to the computing unit 115, such as a portable ultrasound, a blood pressure monitor, a medical imaging device, and the like. This personal data may include for example, maternal height, maternal weight, uterus width, abdominal width, abdominal depth, abdominal circumference, symphysiofundal height, symphysis to umbilicus distance, umbilicus to xiphisternum distance or midline to fundus distance. Based on the maternal anatomic data, the system 100 uses a statistical or machine learning model utilizing various subsets of the above-said anatomic features to determine the optimal placement of the sensor array close to the fetal heart position. The prediction of the fetal heart position is displayed on a screen of the computing unit 115 and is used to inform the user about the placement of the monitoring device 102, so that the sensor array is close to the fetal heart position with the reference electrodes 120-1 through 120-N below the heart position and the sensing electrodes 105-1 through 105-N above the fetal heart position to provide optimal signal quality. In some embodiments, the sensor array is close to the fetal heart position with the reference electrodes 120-1 through 120-N above the heart position and the sensing electrodes 105-1 through 105-N below the fetal heart position. The optimal initial sensor placement is determined in reference to one of the following maternal anatomic landmarks: umbilicus or symphysis pubis.

In the same embodiment, guidance may be provided to the user via the computing unit 115 in the form of text, a symbol, a sound, a vibration, an image, a video, an electromagnetic signal, and the like. The user may be instructed to modify current sensor placement on the maternal abdomen or replace the sensors in case of a failure, to change the user's current activity or posture (for example, changing from a sitting to standing position or begin a breathing exercise), to seek medical attention, and so on.

The monitoring device 102 includes an ability to switch between multiple algorithms and/or algorithm parameters to obtain optimal signal quality for monitoring maternal and fetal heart rate activities. In some embodiments, this switching ability is integrated as an activity recognition procedure which determines the user's current activity (for example, sitting, standing, walking) and switches between a bank of algorithms or algorithm parameters to obtain optimal signal quality.

Figure 2A:
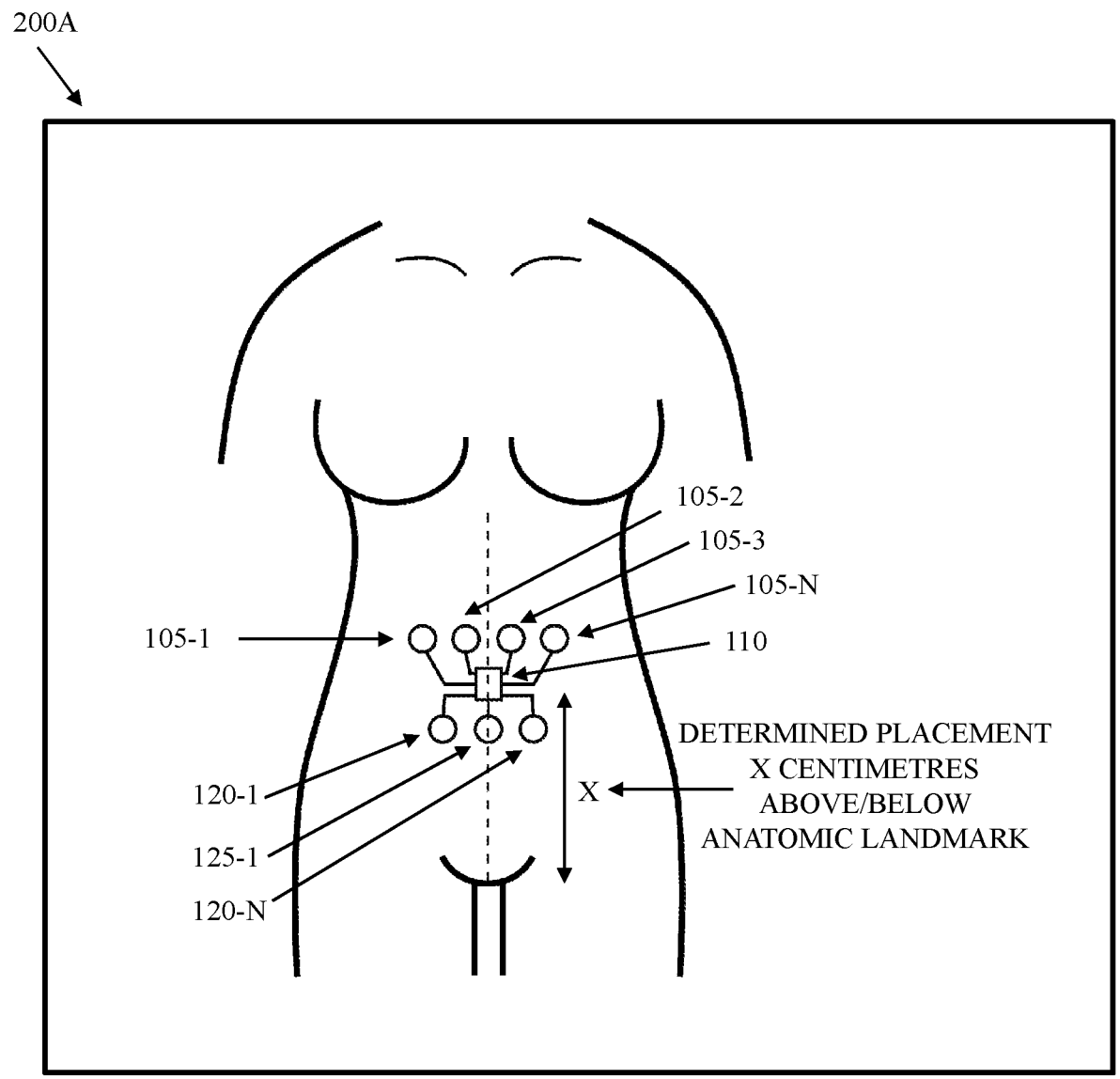
FIG. 2A is an exemplary graphical representation of a monitoring device placed at a determined position on the maternal abdomen, in accordance with an embodiment of the present disclosure.

Furthermore, the monitoring device 102 may also include a plurality of sensors for monitoring environmental data. In some embodiments, the monitoring device 102 also includes one or more sensors for measuring the following signals: acoustic activity, electromagnetic spectra, movement, temperature, and humidity. FIG. 2A is an exemplary graphical representation 200-A of a monitoring device placed at a determined position on the maternal abdomen, in accordance with an embodiment of the present disclosure. The method as disclosed in the present disclosure may be developed to be embedded within an application 115-A that may provide instructions to guide the user through a simple sensor placement process to ensure signal quality. The word 'user' referred herein may be the maternal subject (the end-user), a medical practitioner, clinician, or any person designated to assist in sensor placement.

As described above in FIG. 1, the application 115-A installed on the computing unit 115 allows personal data to be captured via user input or another source connected to the computing unit such as a camera, microphone, touch screen function or connected peripheral device such as but not limited to a portable ultrasound or medical imaging device. In one example, the personal anatomic data may include maternal height, maternal weight, uterus width, abdominal width, abdominal depth, abdominal circumference, symphysiofundal height, symphysis to umbilicus distance, umbilicus to xiphisternum distance or midline to fundus distance. The user may use any suitable measuring device to measure and input the details associated with the anatomic data. Based on the anatomic data obtained, the method as described in the present disclosure and described further is configured to utilize a statistical or machine learning model to predict the true position of the fetal heart with a high accuracy.

Figure 2B:
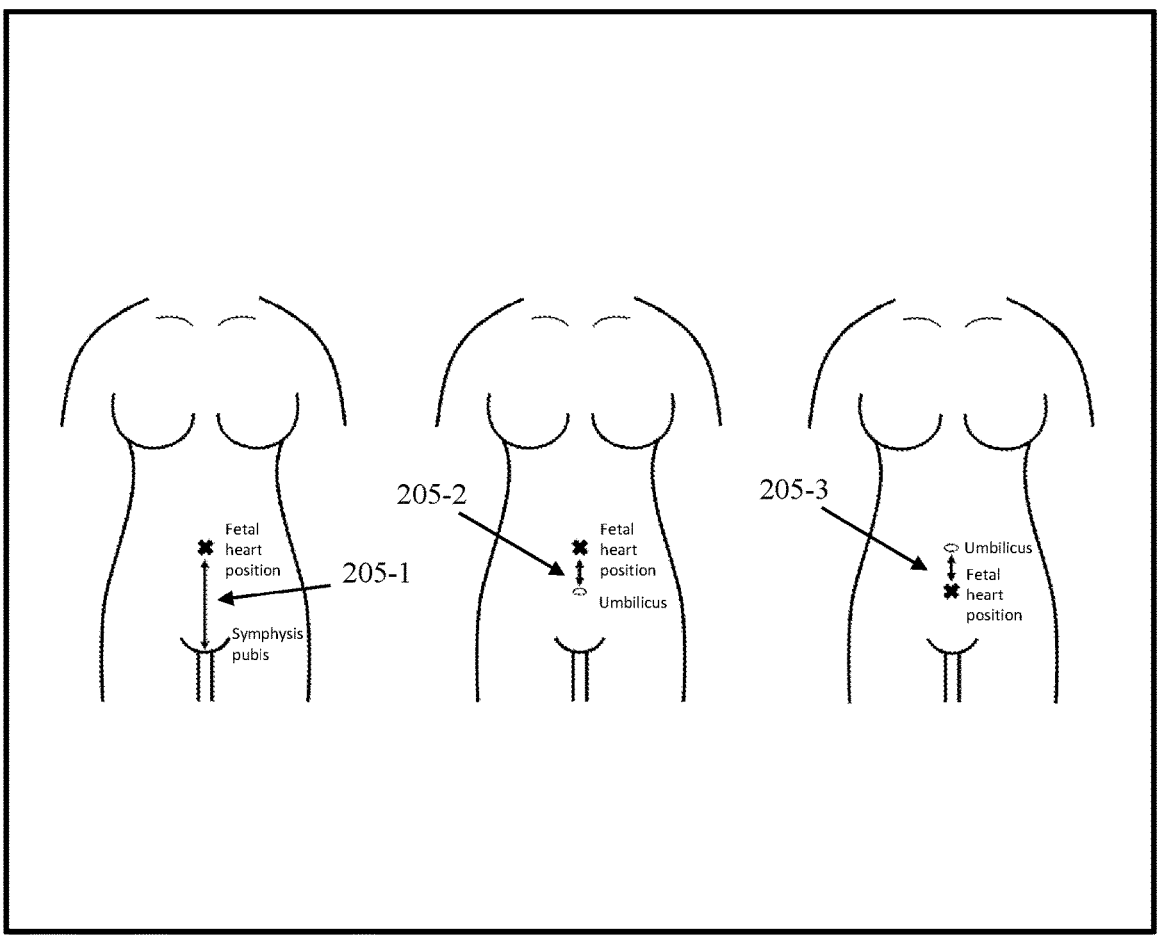
FIG. 2B is an exemplary graphical representation showing anatomic landmarks on the maternal abdomen for measuring estimated position of the fetal heart and determining placement of the monitoring device, in accordance with an embodiment of the present disclosure.

FIG. 2B is an exemplary graphical representation 200-B showing anatomic landmarks on the maternal abdomen for measuring estimated position of the fetal heart and determining optimal placement of the monitoring device, in accordance with an embodiment of the present disclosure. Once the personal data has been captured, a statistical or machine learning model is used to calculate the displacement (as shown in FIG. 2B) at which the monitoring device 102 should be placed. The displacement is calculated based on an anatomic landmark (that is to say; the symphysis pubis or umbilicus) to center the monitoring device 102 close to the fetal heart position. The calculated displacement and an image of the monitoring device 102 are displayed on the screen of the computing unit 115 as shown in FIG. 2A to guide the user in placing the monitoring device 102. The calculated displacement may be shown in one of several configurations as shown in FIG. 2B, as either above the symphysis pubis 205-1, above the umbilicus 205-2, or below the umbilicus 205-3.

Figure 2C:
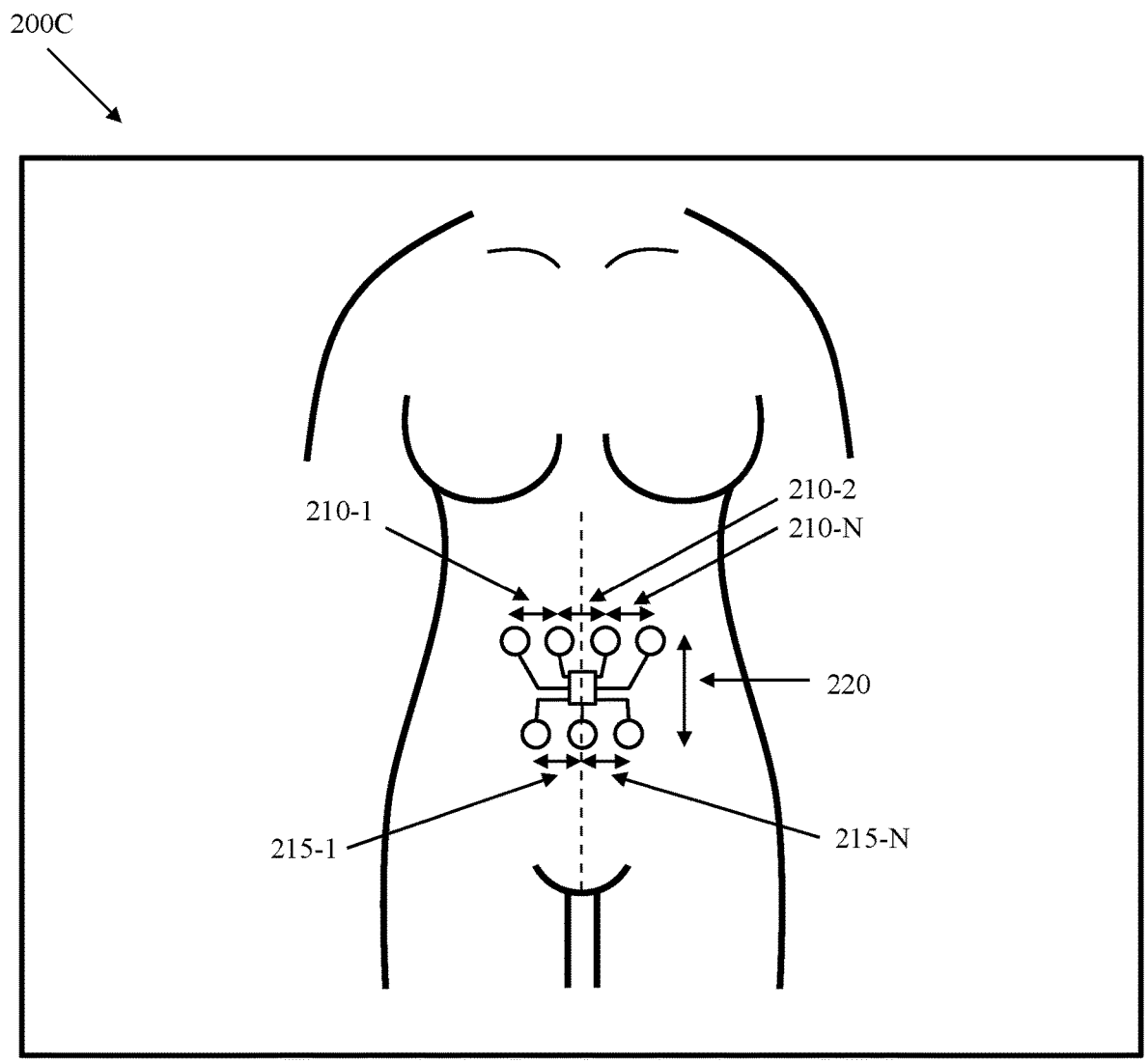
FIG. 2C is an exemplary graphical representation showing a layout of a sensor array of the monitoring device, in accordance with an embodiment of the present disclosure.

FIG. 2C is an exemplary graphical representation 200-C showing a layout of a sensor array of the monitoring device, in accordance with an embodiment of the present disclosure. In order to provide the optimal sensor placement and signal quality for monitoring maternal and fetal activities, the sensor array is arranged in a form of a layout as shown in FIG. 2C. Each of the sensors 105-1 through 105-N are arranged with a predetermined spatial distance 210-1 through 210-N between them. In one example, the spatial distance 210-1 through 210-N between adjacent sensors may be of similar value or may be different values. In addition to the sensors 105-1 through 105-N, one or more reference electrodes 120-1 through 120-N and a ground electrode 125-1 are arranged with a predetermined spatial distance 215-1 through 215-N, and may be of similar value or may be different values. Based on the typical position of the fetal heart within the maternal abdomen and depending on the number of sensors configured, the spatial distance 210-1 through 210-N and the spatial distance 215-1 through 215-N may take a value between 5 and 15 centimeters. This ensures that one or more sensors and one or more reference electrodes are positioned close to the fetal heart in terms of horizontal displacement. In some configurations, the ground electrode 125-1 position may be swapped with one of the reference electrodes 120-1 through 120-N. To ensure that the sensor array is positioned at an optimal placement either side of the true fetal heart position, the sensors 105-1 through 105-N are vertically displaced by a spacing 220 from the one or more reference electrodes 120-1 through 120-N and the ground electrode 125-1. In some examples, the spacing 220 may range from 5 centimeter displacement to 25 centimeter displacement. For example, the spacing 220 may include a 5 centimeter displacement, a 10 centimeter displacement, a 15 centimeter displacement, a 20 centimeter displacement, 25 centimeter displacement or any displacement between these values.

Figure 2D:
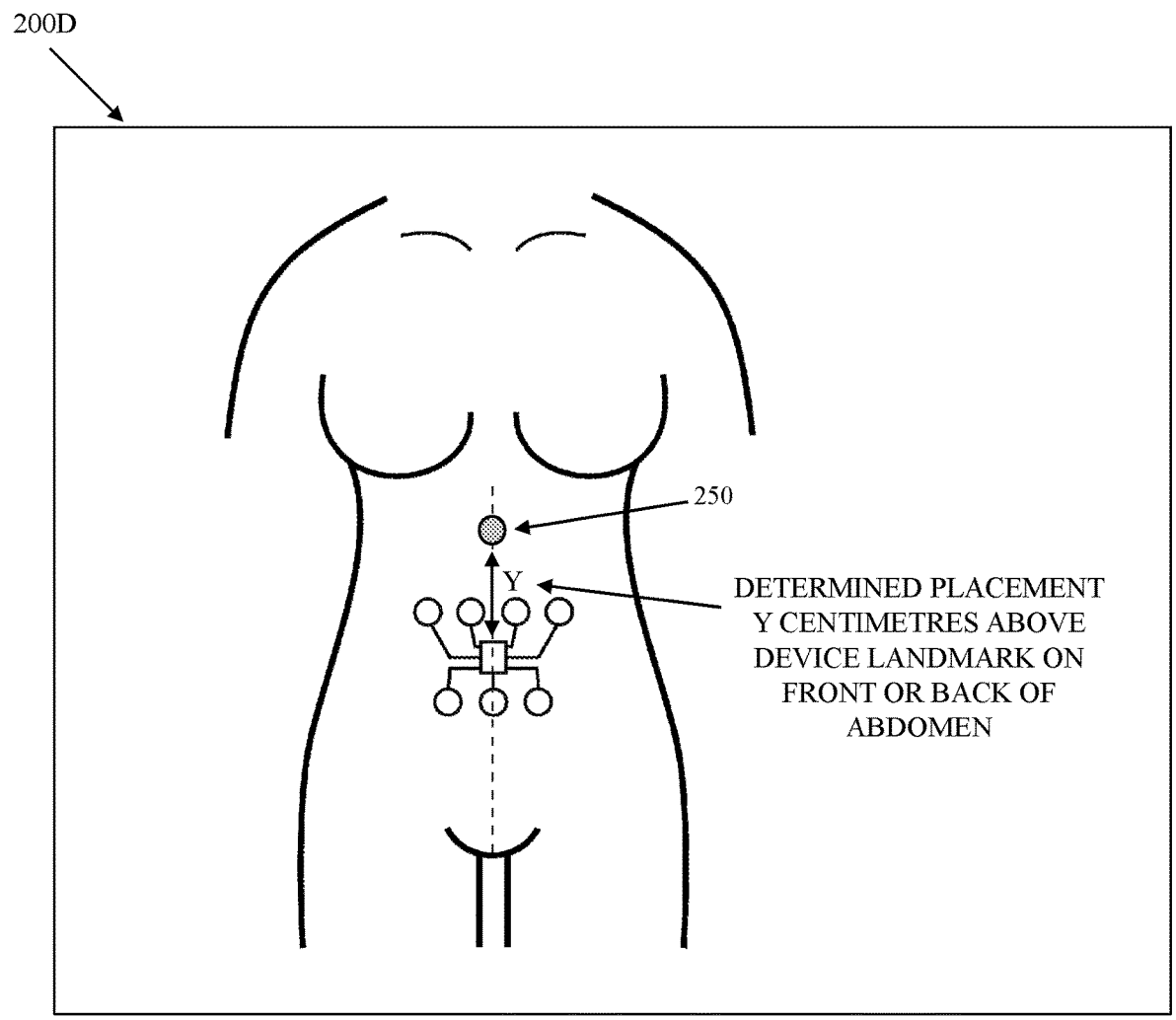
FIG. 2D is an exemplary graphical representation of the monitoring device and an additional sensor placed based on a signal quality assessment, in accordance with an embodiment of the present disclosure.

FIG. 2D is an exemplary graphical representation 200D of the monitoring device and an additional sensor 250 placed, when needed, decided based on the signal quality assessment, in accordance with an embodiment of the present disclosure. In one embodiment of the present disclosure, once the monitoring device 102 has been placed over a maternal abdomen for monitoring the maternal and fetal activities, each sensor 105-1 through 105-N from the sensor array is analyzed for a signal quality assessment to ensure the adequacy of the fetal heart rate, uterine contractions and maternal heart rate or other parameters of interest. If signals of inadequate quality are obtained, the user will be instructed to either remove the sensor array 105-1 through 105-N and place the sensor array 105-1 through 105-N in a different position or place the additional sensor 250 in addition to the existing sensors present in the monitoring device 102. In other words, if the processed fetal component in one or more channels of the monitoring device 102 fails to meet a minimum signal quality threshold, the system 100 will indicate to the user that the sensor array must be removed and placed in a different position or the additional sensor 250 must be placed on the maternal abdomen. The additional sensor 250 would be connected via a separate cable or other communication medium other than the existing sensors which are embedded in the monitoring device 102.

In the same embodiment, a position for the placement of the additional sensor 250 is determined based on a statistical or machine learning model, for example an artificial neural network, a support vector machine, a naïve Bayes, a k-nearest neighbour, a decision tree, a logistic regression or similar. In some embodiments, the additional sensor 250 is placed at a position, which is determined using a physics based model which computes the inverse transfer function using either a single or multi-layer compartment model which is created from realistic or simplified maternal-fetal geometries acquired via MRI (Magnetic Resonance Imaging), ultrasound or any other acquisition method. The inverse transfer function may be computed using a least-squares fitting, Moore-Penrose pseudoinverse, beamforming, maximum likelihood estimation, maximum a posteriori estimation, and the like.

Once the signal quality is obtained that meets the required threshold, the system 100 will select the optimal sensor(s) for analysis using autocorrelation, cross-correlation or regularity analysis (such as Approximate Entropy, Sample Entropy, Fuzzy Entropy or similar) and perform independent component analysis (ICA), principal component analysis (PCA), singular value decomposition (SVD), Kalman filtering (KF), a machine-learning based processing technique, or some combination of these approaches to extract a signal representing the fetal ECG component. The monitoring device will automatically compare signal quality from both sensors contained within the sensor array, composed of sensors 105-1 through 105-N, one or more reference electrodes 120-1 through 120-N and a ground electrode 125-1 and the new sensor or sensor array 250 placed according to the procedure described in FIG. 3E. From the extracted fetal ECG component, a fetal heart rate time series will be extracted and optionally information on the amplitude and timing of one or more of the following features: P wave onset, peak and end, QRS complex onset, peak and end, T wave onset, peak and end.

Using the extracted biomarkers of maternal and fetal health, such as the FHR time series, MHR time series, uterine activity or PQRST timing and amplitude, an assessment of maternal and/or fetal health is subsequently made using either a machine learning model trained on pre-existing data and patient outcomes or using a feature based classifier which employs one or more of the following metrics, FIGO-like criteria, Approximate Entropy, Sample Entropy, Fuzzy Entropy or any of these entropy measures computed at multiple tolerances or using a data-driven entropy profiling approach.

In one example embodiment, to assess the signal quality of each sensor channel and determine the optimal sensors for extracting information on maternal and fetal activities, each measurement channel is then assessed for fetal electrophysiological signal quality using the following approach: 1) Each measurement channel is pre-processed using a low-pass filter with 100 Hz cutoff and high-pass filter with 1 Hz cutoff, 2) This is followed by a 50 or 60 Hz notch filter at the appropriate frequency for the region of operation to suppress residual power line interference.

Other pre-processing methods with similar cut-off frequencies may be substituted in this step. Both filters are applied in the forward and reverse direction to provide zero-phase filtering. After pre-processing, a template of the maternal ECG is built by:

1) First performing independent component analysis (ICA), principal component analysis (PCA), singular value decomposition (SVD), Kalman filtering (KF), a machine-learning based processing technique, or some combination of these approaches to extract a signal representing the maternal ECG component, followed by a detection algorithm to determine the location of each maternal QRS complex,
2) From the detected maternal QRS locations, an average maternal ECG template is built by averaging each maternal ECG cycle over n cycles where n may take the range of 2-100. The average maternal ECG is then adapted to each ECG cycle using a scalar gain for each cycle or a scalar gain for subsections of the cycle each corresponding to the P wave, QRS complex or T wave.

Figure 2E:
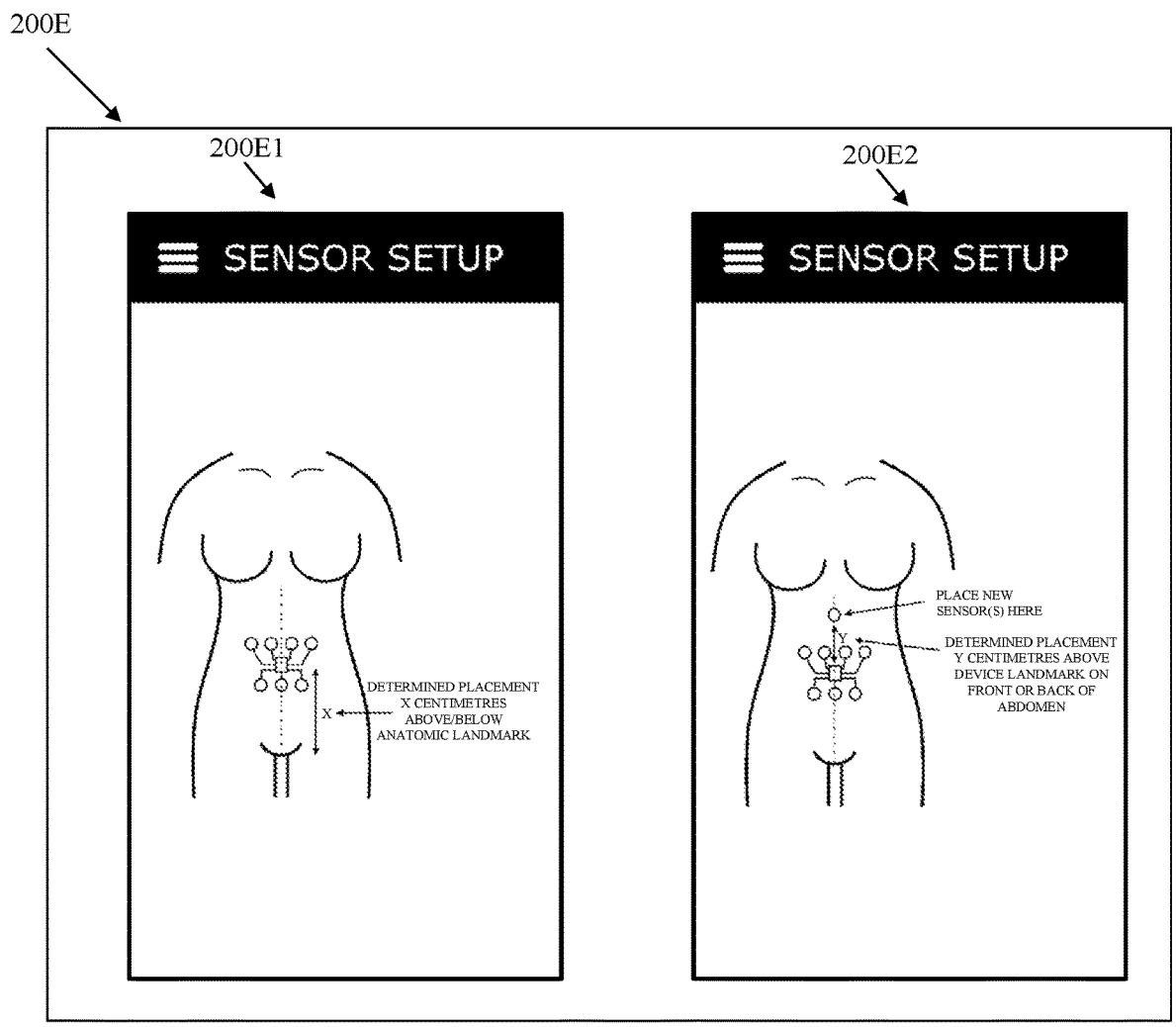
FIG. 2E illustrates an exemplary image of a graphical interface of the computing device for providing instructions to the user for placement of the monitoring device and an additional sensor, in accordance with an embodiment of the present disclosure.

The adapted maternal ECG signal is then subtracted for each channel and the remaining fetal electrophysiological signal optionally passed through additional filtering stages which perform low, high, or bandpass filtering, independent component analysis (ICA), principal component analysis (PCA), singular value decomposition (SVD), Kalman filtering (KF), a machine-learning based processing technique, or some combination of these approaches. The remaining filtered signal is then passed through an autocorrelation, cross-correlation or regularity analysis function (such as Approximate Entropy, Sample Entropy, Fuzzy Entropy, or similar) to determine the approximate locations of fetal QRS complexes and the average amplitude of the fetal QRS complex in each measurement signal;

FIG. 2E shows an exemplary image 200E1 and 200E2 of a graphical interface of the computing device for providing instructions to the user for placement of the monitoring device and an additional sensor in accordance with an embodiment of the present disclosure. The text on image 200E1 reads as follows: "Determined placement x centimetres above symphysis pubis or umbilicus" where x will be explicitly given according to the sensor placement algorithm. The text on image 200E2 reads as follows: "Place new sensor(s) here" "Determined placement y centimetres above device landmark on front or back of abdomen" where y, device landmark, and front or back of abdomen will be explicitly given according to sensor placement method as disclosed herein.

Figure 3A:
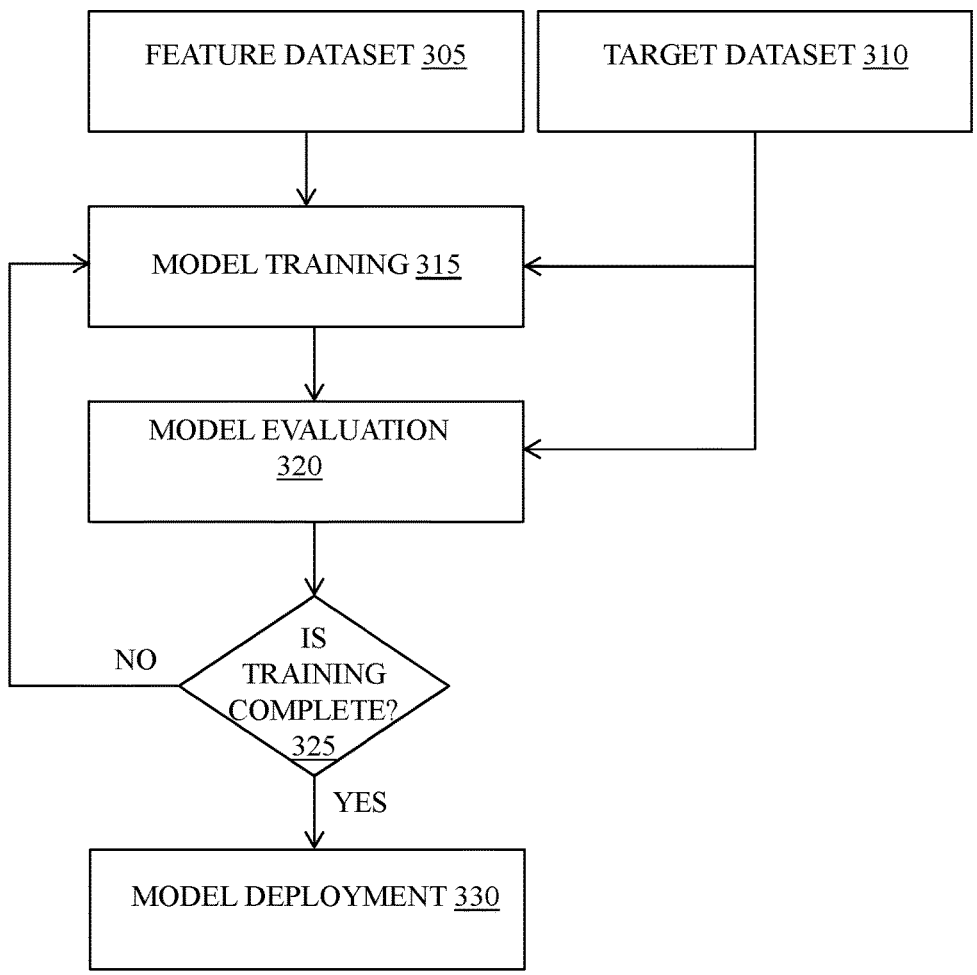
FIG. 3A illustrates a state diagram describing a process implemented for training and deploying a statistical or machine learning model for determining optimal sensor placement on the maternal abdomen, based on captured personal data and historical data, in accordance with an embodiment of the present disclosure.

FIG. 3A illustrates a state diagram 300A describing a process implemented for training and deploying a statistical or machine learning model for determining optimal sensor placement on the maternal abdomen, based on captured personal data and historical data. FIG. 3A may be described from the perspective of a processor (not shown) or one or more processors configured for executing computer readable instructions stored in a memory, to carry out the functions of the blocks or units of the system 100. In particular, the steps as described in FIG. 3A may be executed for training and deploying a statistical or machine learning model for determining optimal sensor placement on the maternal abdomen. The machine learning model is trained based on captured personal data and historical data collected from plurality of subjects, which is then deployed on the processor of the computing unit 115 of system 100 for making inferences to novel personal data as further described in 300B. Each step is described in detail below.

At step 305, a feature dataset is obtained. At step 310, a target dataset is obtained. At step 315, a machine learning model is trained based on the dataset obtained at step 305 and 310. In one embodiment, at step 315, utilizing various subsets of the feature dataset 305 and target dataset 310, a model is trained to predict the true position of the fetal heart in relation to the umbilicus or symphysis pubis with high accuracy. It may be noted herein that the training utilizes various subsets of the above-said anatomic features to create a model that predicts the true position of the fetal heart. The algorithm is not limited to a machine learning algorithm, for example an artificial neural network, a support vector machine, a naïve Bayes, a k-nearest neighbour, a decision tree, a logistic regression, and the like.

In order to train the model, which determines the optimal method of placing the sensor array on the maternal abdomen, anatomic data is collected from a plurality of subjects, referred as the feature dataset 305. It is to be noted that the feature dataset is also referred as historical data collected from a plurality of subjects. The feature dataset is comprised of data such as maternal height, maternal weight, uterus width, abdominal width, abdominal depth, abdominal circumference, symphysiofundal height, symphysis to umbilicus distance, umbilicus to xiphisternum distance or midline to fundus distance, and the like. In addition to the feature dataset, the position of the fetal heart is also measured with respect to the maternal umbilicus, symphysis pubis or similar anatomic landmark, referred to as the target dataset 310.

At step 320, the generated model is evaluated against the target dataset 310 to determine its accuracy for predicting the true position of the fetal heart. This evaluation procedure may consist of determining the minimum absolute error, least squares error, hold-out error or cross-validation error to compare the estimates of the fetal heart position generated by the model against the true fetal heart position values contained in the target dataset 310.

At step 325, the error determined in the model evaluation step 320 is compared against a desired threshold to determine whether another round of training should commence. If the error is above the desired threshold, the process returns to step 315. If the error is below the desired threshold, the process advances to step 330.

At step 330, a final model is deployed which is ready to accept new personal data and generate estimates of the fetal heart position in accordance with an embodiment of the present disclosure.

Figure 3B:
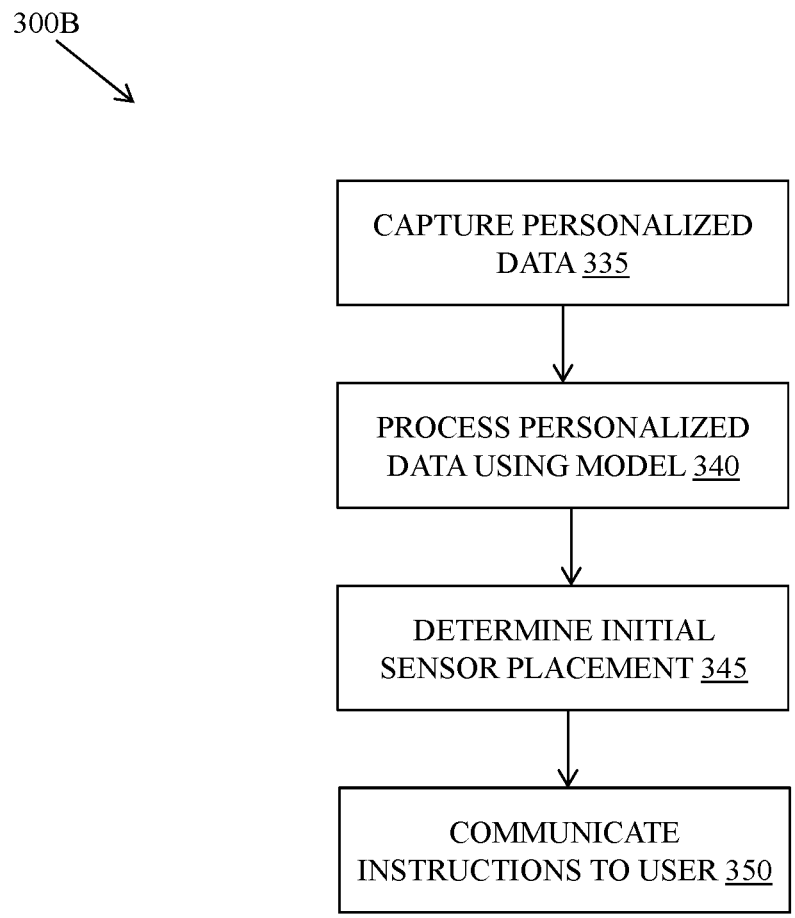
FIG. 3B illustrates a state diagram describing a process implemented for placement of an initial sensor array on the maternal abdomen, in accordance with an embodiment of the present disclosure.

FIG. 3B illustrates a state diagram describing a process 300B implemented for placement of initial sensor array on the maternal abdomen, in accordance with an embodiment of the present disclosure. FIG. 3B may be described from the perspective of a processor (not shown) or one or more processors configured for executing computer readable instructions stored in a memory, to carry out the functions of the blocks or units of the system 100. In particular, the steps as described in FIG. 3B may be executed for placement of initial sensor array on the maternal abdomen. In accordance with the present embodiment, this process 300B utilizes a deployed model as described in method 300A to predict the fetal heart position for optimal sensor placement and signal quality for monitoring maternal and fetal activities. Each step is described in detail below.

At step 335, personal data is captured via user input or another source connected to the computing unit such as a camera, microphone, touch screen function or connected peripheral device such as but not limited to a portable ultrasound or medical imaging device. The captured data can be for example maternal height, maternal weight, uterus width, abdominal width, abdominal depth, abdominal circumference, symphysiofundal height, symphysis to umbilicus distance, umbilicus to xiphisternum distance or midline to fundus distance. It may be noted herein that the application 115-A of the computing unit 115 provides a user interface that allows the user to capture personal anatomic data.

At step 340, the model deployed at step 330 is utilised to process the captured personal data. It may be noted herein that the model utilizes various subsets of the above-said anatomic to predict the true position of the fetal heart. The model typically consists of, but is not limited to, a machine learning algorithm, an artificial neural network, a support vector machine, a naïve Bayes, a k-nearest neighbor, a decision tree, a logistic regression, and the like.

At step 345, an initial sensor placement is determined. Based on the output of the model deployed in step 330, the system 100 calculates a position to place the sensor array coupled with the data acquisition and transmission unit 110 close to the fetal heart position.

At step 350, an instruction is communicated to the user via the application 115-A on the computing unit 115 with the determined placement position.

Figure 3C:
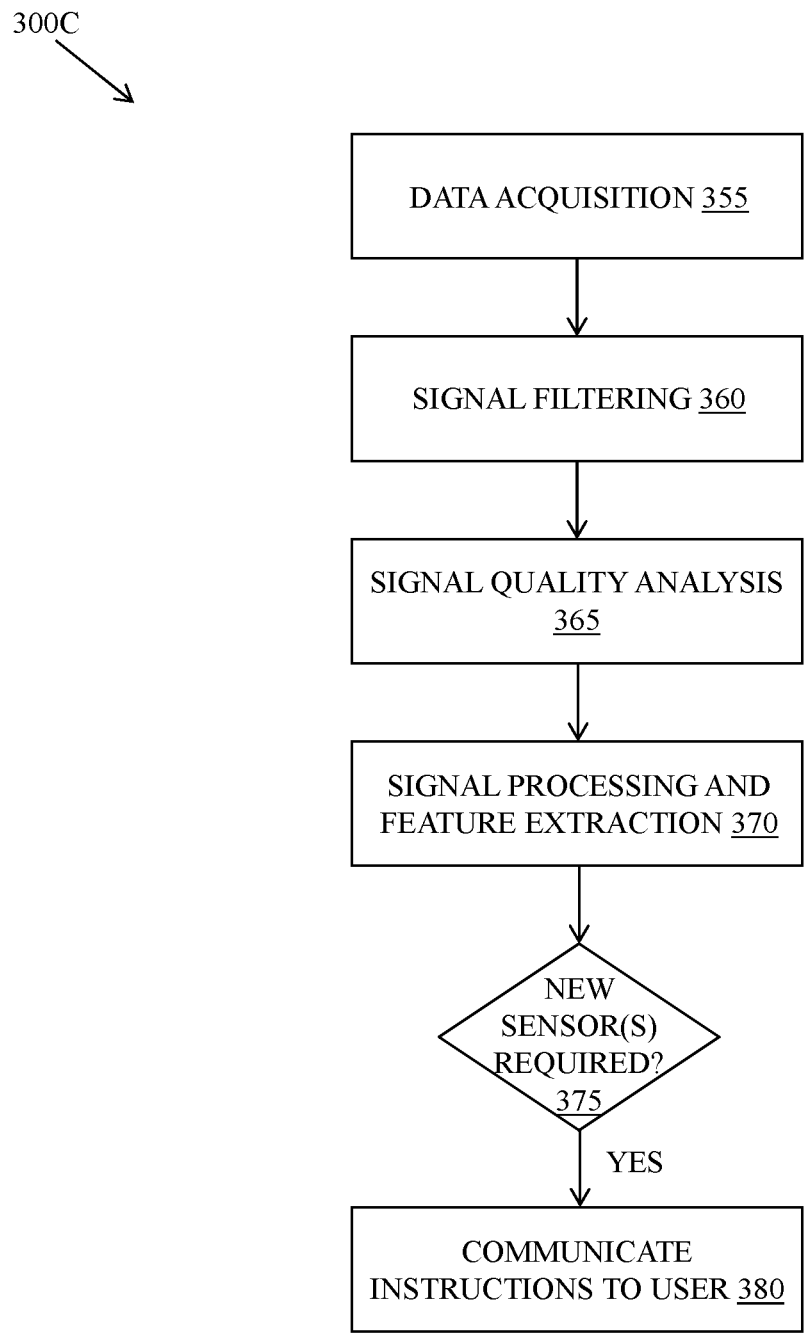
FIG. 3C illustrates a state diagram describing a process implemented for signal quality analysis for arriving at a decision for placement of additional sensor(s) on the maternal abdomen, in accordance with an embodiment of the present disclosure.

FIG. 3C illustrates a state diagram describing a process 300C implemented for signal quality analysis for arriving at a decision for placement of additional sensor(s) on the maternal abdomen, in accordance with an embodiment of the present disclosure;

At step 355, data is acquired by a data acquisition and transmission unit 110. It may be noted herein that the data acquisition and transmission unit 110 is placed over a maternal abdomen configured for acquiring signals/data related to fetal heart rate, fetal position, uterine contractions, maternal heart rate signal, maternal movement, fetal movement, and the like. The signals/data are acquired via plurality of sensors 105-1 through 105-N, one or more reference electrodes 120-1 through 120-N and a ground electrode 125-1 are coupled with the data acquisition and transmission unit 110.

At step 360, signals are filtered. The signals herein refer to the signals acquired by the data acquisition and transmission unit 110. The acquired signals are passed through a filter which perform low, high or bandpass filtering, ICA (Independent Component Analysis), PCA (Principal Component Analysis), SVD (Singular Value Decomposition), KF (Kalman Filtering), a machine-learning based processing technique, or a combination thereof of these approaches to remove signal noise.

At step 365, quality of signals is analyzed. It may be noted herein that the signal quality of each sensor 105-1 through 105-N when measured in reference to one or more of the reference electrodes 120-1 through 120-N is analyzed. Once the monitoring device 102 has been placed over the maternal abdomen, the system 100 undertake a signal quality assessment to ensure an adequate fetal heart rate, uterine contractions and maternal heart rate signal are obtained.

At step 370, signals are processed, and features are extracted. Based on assessing the signal quality of each sensor 105-1 through 105-N when measured in reference to one or more of the reference electrodes 120-1 through 120-N, the system 100 further determines an optimal sensor or sensors for extracting features related to fetal and maternal activities, for example fetal heart rate, fetal movement, fetal orientation, fetal oxygen saturation, fetal position, maternal heart rate, maternal respiratory rate, maternal oxygen saturation, maternal movement, maternal blood pressure, and the like.

At step 375, assessment of a new sensor or sensor array 250 is determined. The new sensor or sensor array 250 is required if signals of inadequate quality are obtained or the processed fetal component in one or more channels fails to meet a minimum signal quality threshold as an amplitude in volts or as a signal to noise ratio or an entropy based metric such as Approximate Entropy, Sample Entropy, Fuzzy Entropy, and the like.

At step 380, an instruction is communicated to the user in case a new sensor or sensor array 250 is required. The user will be instructed to either remove the whole sensor array 105-1 through 105-N and place the whole sensor array 105-1 through 105-N again in a new position or place a new sensor or sensor array 250 in addition to the existing sensors. The new sensor or sensor array 250 for measuring electrical activity preferably consists of silver/silver-chloride (Ag/Ag—Cl) electrodes connected to a printed circuit board (PCB) via wires or embedded in a flexible material such as polyethylene terephthalate (PET), thermoplastic polyurethane (TPU) or similar polymer with flexible conductive traces printed on polymer film. In some embodiments, the new sensor or sensor array 250 may also take the form of dry or textile-based electrodes comprised of graphene, silver or other conductive materials interwoven with or coated on traditional fibres such as cotton, nylon, polypropylene, and the like. In some embodiments, the new sensor or sensor array 250 may take the form of an 'electronic tattoo' composed of layers of gold, polyethylene terephthalate (PET), thermoplastic polyurethane (TPU) or similar polymer, chromium (CR) and adhesive, providing a soft conformable surface for precise skin coupling. The new sensor or sensor array will connect to the monitoring device 100 via a cable or any other communication medium. After connection, the sensor(s) contained in 250 will be considered as equal signals to those provided by sensors 105-1 through 105-N for the purpose of monitoring maternal and fetal activities as described in this disclosure.

Figure 4A:
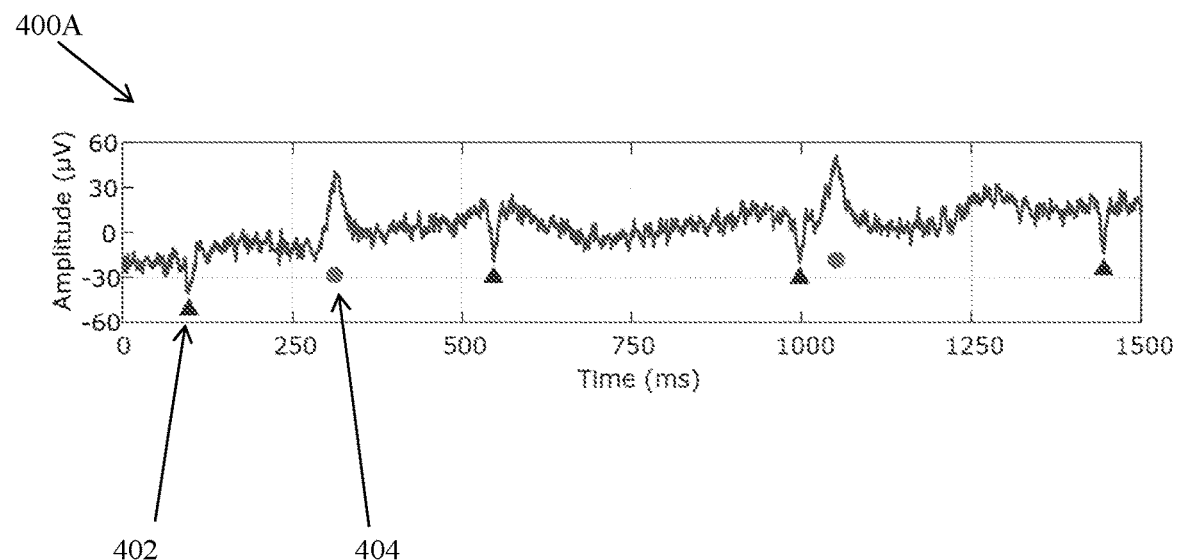
FIG. 4A illustrates a waveform illustrating electrical signals recorded from a signal sensing electrode indicating fetal QRS complexes and maternal QRS complexes, represented by triangles and circles respectively, in accordance with an embodiment of the present disclosure.
Figure 4B:
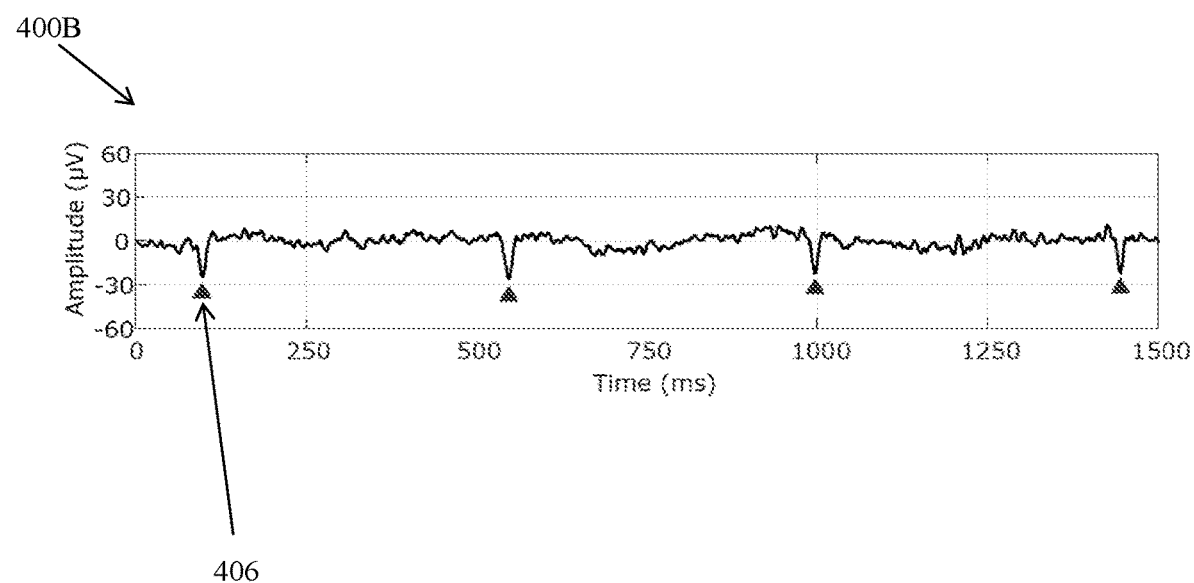
FIG. 4B illustrates a waveform illustrating the electrical signal representing the fetal ECG signal after removal of the maternal ECG, represented by triangles indicating the fetal QRS complexes, in accordance with an embodiment of the present disclosure.

FIG. 4A and FIG. 4B illustrate a waveform 400A illustrating electrical signals recorded from a signal sensing electrode indicating fetal QRS complexes and maternal QRS complexes, represented by triangles 402 and circles 404, respectively and a waveform 400B illustrating the electrical signal representing the fetal ECG signal after removal of the maternal ECG, represented by triangles 406 indicating the fetal QRS complexes in accordance with an embodiment of the present disclosure.

As mentioned earlier, the signals/data are acquired by the monitoring device 102. When the monitoring device 102 is placed over the maternal abdomen, the signals/data acquired by the monitoring device 102 are further encoded, transmitted, and processed via an encoder, a transmitter 110-A, and a processor 110-B, respectively of the data acquisition and transmission unit 110 for determining one or more features, for example:

(1) maternal and fetal electrocardiography (ECG) waveform characteristics including the timings and amplitudes of the P wave that is to say; onset, peak and end, QRS complex that is to say; onset, peak and end, and the T wave that is to say; onset, peak and end;

(2) intervals and ratios between maternal and fetal ECG waveform characteristics including PQ interval, PR interval, QRS interval, QT interval, RR interval, P/QRS ratio, and T/QRS ratio;

(3) fetal heart rate, fetal oxygen saturation, fetal movement, fetal position and fetal orientation;

(4) maternal heart rate, maternal respiratory rate, maternal oxygen saturation, maternal movement, maternal blood pressure, and uterine activity; and (5) a context of a device use including one or more states, for example sitting, standing, sleeping, running, showering and/or bathing of a user (for example, the maternal).

In one embodiment of the present disclosure, referring to FIG. 4A, in order to extract features described above in point 1 and point 2, the data acquisition and transmission unit 110 is configured to process abdominal electrical signals as measured from the maternal abdomen at each of the sensors 105-1 through 105-N with respective to the chosen reference electrode 120-1 through 120-N. Each of these abdominal electrical signals will look similar to FIG. 4A before signal processing.

For each of the abdominal electrical signals, a template for the maternal ECG is built. The template for the maternal ECG is built by: (1) First performing ICA (Independent Component Analysis), PCA (Principal Component Analysis), SVD (Singular Value Decomposition), KF (Kalman Filtering), a machine-learning based processing technique, or a combination thereof of these approaches to extract a signal representing the maternal ECG component, followed by a detection algorithm to determine the location of each maternal QRS complex; (2) From the detected maternal QRS locations, an average maternal ECG template is built by averaging each maternal ECG cycle over n cycles where n may take the range of 2-100, for example. This is how the maternal ECG template is calculated.

Figure 5:
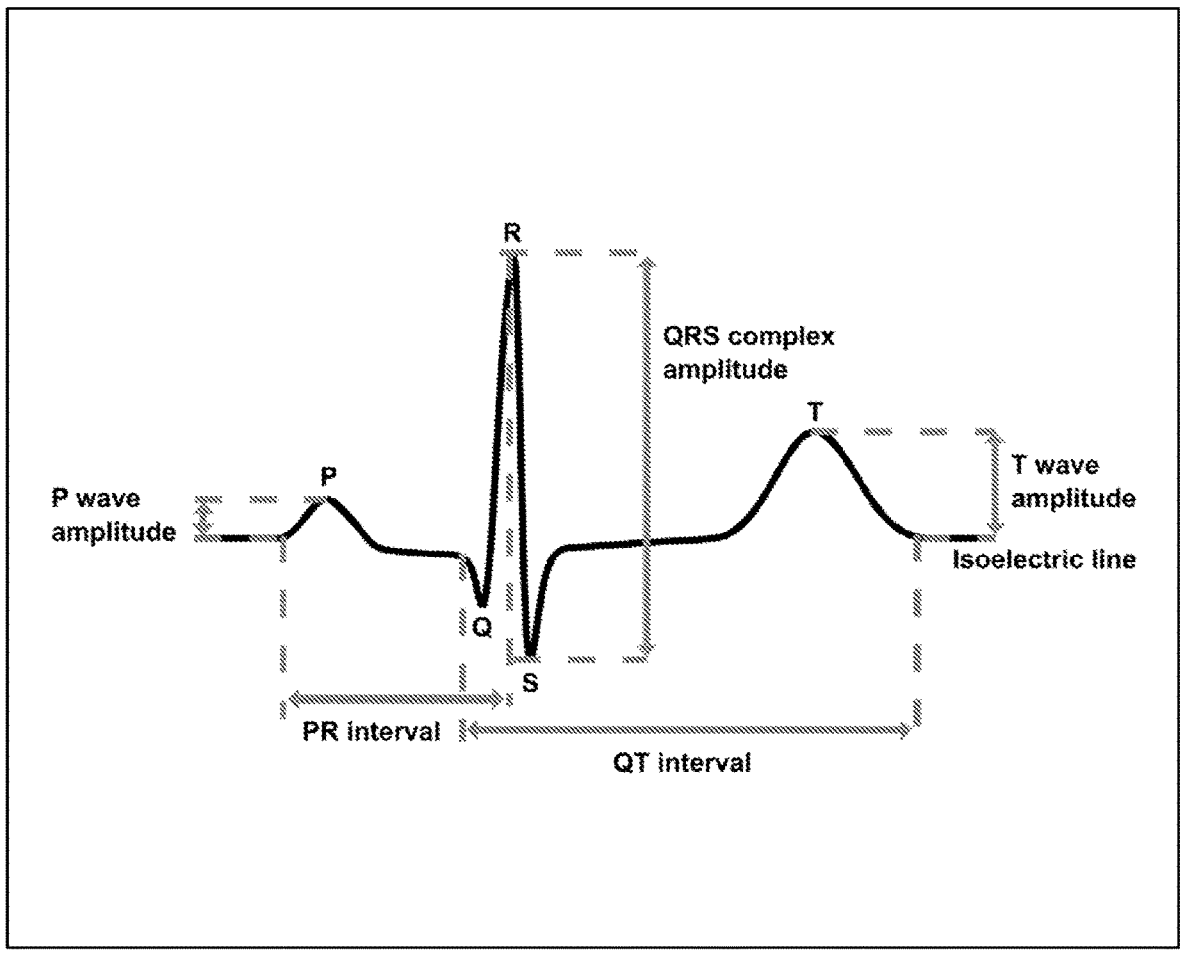
FIG. 5 illustrates an exemplary waveform of a maternal or fetal ECG template annotated with P, Q, R, S, T events, amplitudes and timings, in accordance with an embodiment of the present disclosure.

The calculated maternal or fetal ECG template is shown in FIG. 5, where each of the features such as the P wave amplitude, Q wave amplitude, R wave amplitude, S wave amplitude, T wave amplitude, PQ interval, PR interval, QRS interval, RR interval, P/QRS ratio, and T/QRS ratio, and the like may be calculated with the aid of an algorithmic waveform annotator.

In the same embodiment, once the maternal ECG features have been calculated, the maternal ECG is then removed from the abdominal signals by either 1) adapting the maternal ECG to each cycle using a scalar gain for each cycle or a scalar gain for subsections of the cycle each corresponding to the P wave, QRS complex or T wave, or 2) using an independent or principal component analysis derived technique to remove the signal component corresponding to the maternal ECG. After removal of the maternal ECG, only the fetal electrophysiological signal remains.

The remaining fetal electrophysiological signal after the removal of the maternal ECG is shown in FIG. 4B. The remaining fetal electrophysiological signal is then passed through a plurality of additional filtering stages. The plurality of the additional filtering stages perform low, high or bandpass filtering, ICA (Independent Component Analysis), PCA (Principal Component Analysis), SVD (Singular Value Decomposition), KF (Kalman Filtering), a machine-learning based processing technique, or a combinations thereof of these approaches to remove signal noise.

Further, in the same embodiment, features mentioned in point 3 above that is to say; fetal heart rate, fetal oxygen saturation, fetal movement, fetal position and fetal orientation; and in point 4 that is to say; maternal heart rate, maternal respiratory rate, maternal oxygen saturation, maternal movement, maternal blood pressure, and uterine activity; are subsequently calculated using a combination of the extracted fetal and maternal ECG features (for example, QT interval, T/QRS ratio) in combination with the maternal and the fetal ECG templates and other physiological signals such as acoustic activity, electromagnetic spectra, movement, temperature or humidity, and the like.

Furthermore, in the same embodiment, feature mentioned in point 5 above that is to say; the context of the monitoring device 102 use including one or more states, for example sitting, standing, sleeping, running, showering and/or bathing of a user (for example, the maternal) is computed by combining features as described in points 1, 2, 3 and 4 with accelerometer signals recorded on the monitoring device 102. The accelerometer signals are pre-processed with low, high or bandpass filtering, ICA (Independent Component Analysis), PCA (Principal Component Analysis), SVD (Singular Value Decomposition), KF (Kalman Filtering), a machine-learning based processing technique, or a combination thereof of these approaches before being combined in a multi-variable model. The type of the multi-variable model used to determine the user's current state may include, but is not limited to an artificial neural network, a support vector machine, a naïve Bayes, a k-nearest neighbor, a decision tree, a logistic regression model, and the like.

In addition to the same embodiment, the above-said features as described in points 1, 2, 3, 4 and 5 may be computed on the monitoring device 102 itself. In another embodiment, raw signals or intermediary signals are sent to another device for processing, such as the computing unit 115 running the application 115-A or a cloud, fog or edge based server (for example as shown by reference numeral 150). During transmission of the raw signals or the intermediary signals, the signals may be encoded in a compressed format upon which algorithms may be performed directly on the compressed data. In yet another embodiment, the compressed data may be uncompressed for further processing.

FIG. 5 illustrates an exemplary waveform of a maternal or fetal ECG template annotated with P, Q, R, S, T events, amplitudes and timings, in accordance with an embodiment of the present disclosure. Features such as the P wave amplitude, Q wave amplitude, R wave amplitude, S wave amplitude, T wave amplitude, PQ interval, PR interval, QRS interval, RR interval, P/QRS ratio, and T/QRS ratio can be inferred from measures of this waveform.

As mentioned earlier, in one embodiment of the present disclosure, the system 100 also provides a means for assessing signal quality of each sensor 105-1 through 105-N. Based on assessment of the signal quality of each sensor 105-1 through 105-N, the system 100 further determines an optimal sensor or sensors for extracting information on fetal and maternal activities, for example not limited to fetal heart rate, fetal movement, fetal orientation, fetal oxygen saturation, fetal position, maternal heart rate, maternal respiratory rate, maternal oxygen saturation, maternal movement, maternal blood pressure, and the like. However, the present context of the disclosure has been focused on to assess the signal quality of the fetal heart rate signals, though it can be applied to other signals if required.

To assess the signal quality, the fetal ECG signal from each channel is passed through an autocorrelation, cross-correlation, regularity analysis (such as Approximate Entropy, Sample Entropy, Fuzzy Entropy or similar) or function derived from a machine learning model, to determine which sensors likely contain the highest fetal ECG content and minimal noise.

Out of those signals, the signals for further processing are selected based on assessing the autocorrelation, cross-correlation, regularity analysis or machine learning model based values for each sensor channel. The selected signals are then utilised to perform low, high or bandpass filtering, ICA (Independent Component Analysis), PCA (Principal Component Analysis), SVD (Singular Value Decomposition), KF (Kalman Filtering), a machine learning based processing technique, or a combination thereof of these approaches to remove the signal noise. Following the removal of the signal noise, a single signal is selected from the remaining channels as the most likely fetal ECG signal.

The extracted fetal QRS complexes are then compared for morphological similarity based on metrics such as the logarithmic magnitude error (lnMAG) or relative difference measure (RDM). If the QRS complexes meet a predefined threshold of similarity, a template is then generated from between 1 to 100 consecutive fetal QRS complexes to determine the typical fetal QRS complex amplitude as shown in FIG. 5. If the fetal QRS amplitude fails to meet a predefined threshold or the process fails to identify a suitable fetal QRS time series, the signal quality will be assessed as poor and the user may be notified and instructed to modify the current sensor placement on the maternal abdomen or replace the sensors in the case of failure, to modify their current activity or posture (for example, changing from a sitting to standing position or begin a breathing exercise), to seek medical attention and/or to provide assistance to help the user in adjusting the monitoring device 102. The instructions are displayed on a screen of the computing unit 115, the computing unit 115 communicatively coupled with the monitoring device 102. Herein, the instructions are communicated using the computing unit 115 in the form of text, a symbol, a sound, a vibration, an image or a video, an electromagnetic signal, and the like.

Figure 6:
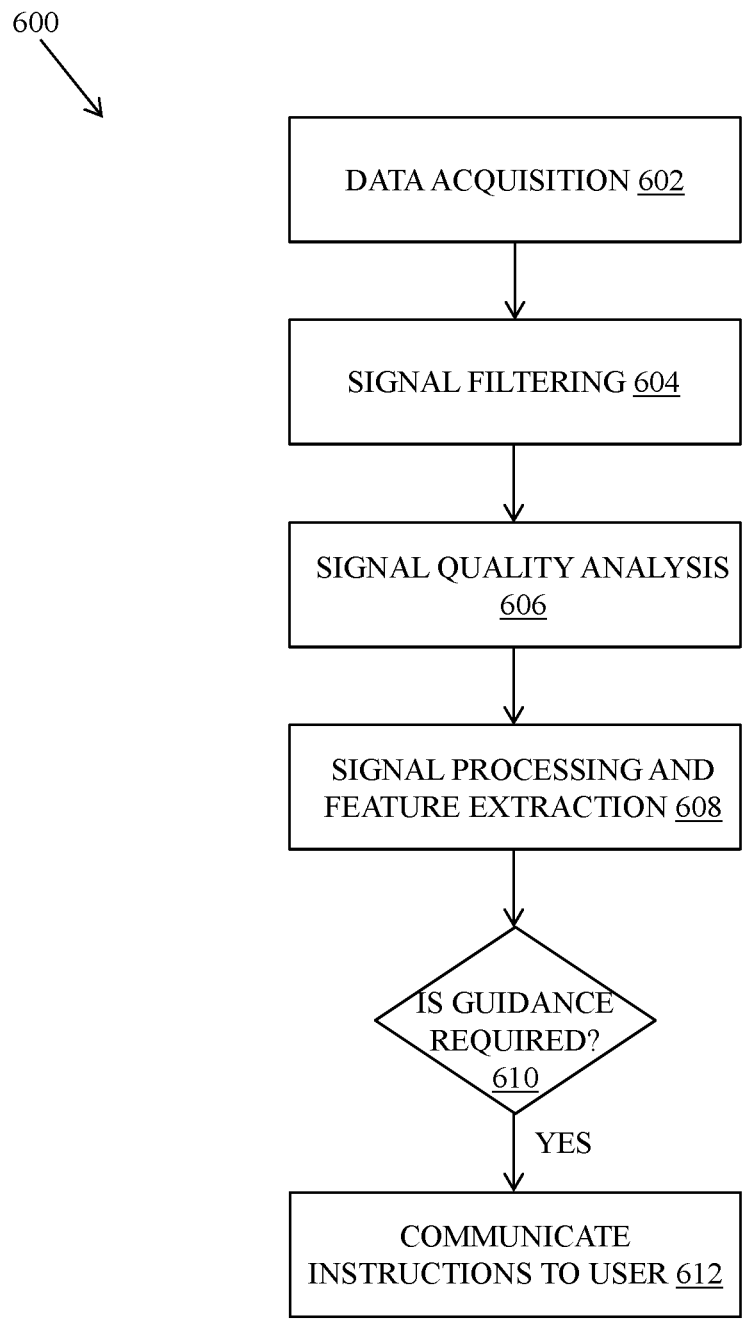
FIG. 6 illustrates a state diagram describing a process implemented for providing guidance to a user during the operation of the monitoring device, in accordance with an embodiment of the present disclosure.

FIG. 6 illustrates a state diagram 600 illustrating a process for providing guidance to a user during the operation of the monitoring device 102 in accordance with an embodiment of the present disclosure.

At step 602, data is acquired by a data acquisition and transmission unit 110. It may be noted herein that the data acquisition and transmission unit 110 is placed over a maternal abdomen configured for acquiring signals/data related to fetal heart rate, maternal heart rate, fetal position, uterine contractions, maternal movement, and the like. The signals/data are acquired via plurality of sensors 105-1 through 105-N are coupled with the data acquisition and transmission unit 110.

At step 604, signals are filtered. The signals herein refer to the signals acquired by the data acquisition and transmission unit 110. The acquired signals are passed through a filter which perform low, high or bandpass filtering, ICA (Independent Component Analysis), PCA (Principal Component Analysis), SVD (Singular Value Decomposition), KF (Kalman Filtering), a machine learning based processing technique, or a combination thereof of these approaches to remove the signal noise.

At step 606, the quality of signals is analyzed. It may be noted herein that the signal quality of each sensor 105-1 through 105-N when measured in reference to one or more of the reference electrodes 120-1 through 120-N is analyzed. Once the monitoring device 102 has been placed over the maternal abdomen, the system 100 undertake a signal quality assessment to ensure an adequate fetal heart rate, uterine contractions and maternal heart rate signal are obtained. If an adequate signal quality is not present, the system may indicate that estimates of physiological parameters such as the fetal heart rate, uterine contractions and maternal heart rate are not available.

At step 608, signals are processed, and features are extracted. Based on assessing the signal quality of each sensor 105-1 through 105-N when measured in reference to one or more of the reference electrodes 120-1 through 120-N, the system 100 further determines an optimal sensor or sensors for extracting features related to fetal and maternal activities, for example fetal heart rate, fetal movement, fetal orientation, fetal oxygen saturation, fetal position, maternal heart rate, maternal respiratory rate, maternal oxygen saturation, maternal movement, maternal blood pressure, and the like.

At step 610, the status if guidance is to be provided to the user is checked. The status of guidance is checked to find if an obtained feature fails to meet a predefined threshold or fails to identify a suitable fetal heart rate, maternal heart rate or uterine contractions signal, the signal quality will be assessed as poor and the user notified and instructed.

At step 612, an instruction is communicated to the user in case guidance is required. The guidance is communicated to the user using a computing unit 115 in the form of text, a symbol, a sound, a vibration, an image or a video, an electromagnetic signal, and the like. In one example, the user may be informed using a notification unit comprising a colour coding scheme similar to a traffic system such as for example, red is 'bad', yellow is 'caution', green is 'all okay'.

Figure 7:
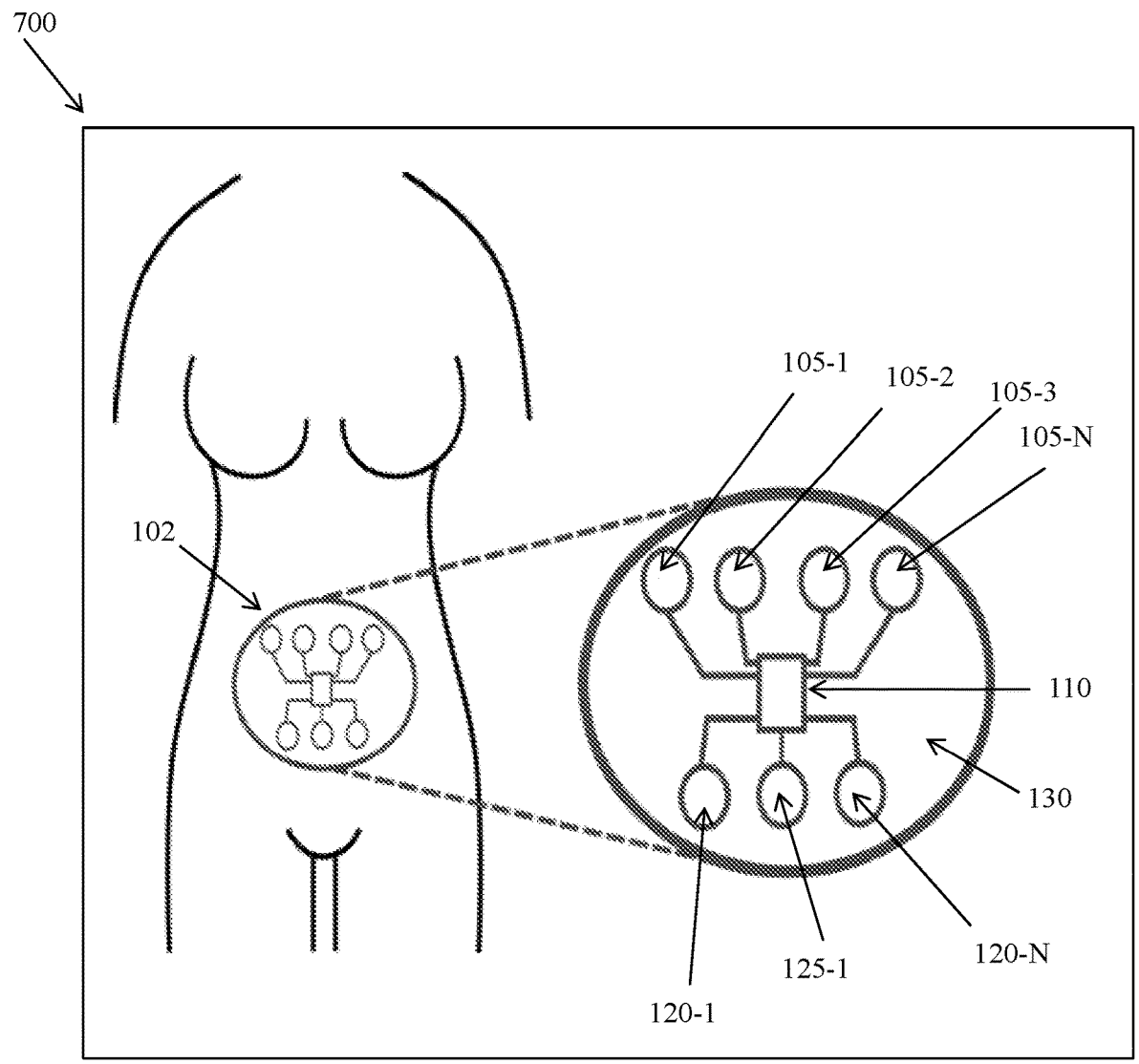
FIG. 7 illustrates the monitoring device, in accordance with an embodiment of the present disclosure.

FIG. 7 illustrates the monitoring device 102 in accordance with an embodiment of the present disclosure. The monitoring device 102 includes a data acquisition and transmission unit 110, a plurality of sensors 105-1 through 105-N, one or more reference electrodes 120-1 through 120-N, a ground electrode 125-1, a cable or any other communication medium associated with each of the plurality of the sensors 105-1 through 105-N, one or more reference electrodes 120-1 through 120-N and ground electrode 125-1, and a disposable adhesive 130 at the rear face of the monitoring device 102. In addition, the monitoring device 102 has a disposable adhesive 130 at its rear end such that the monitoring device 102 does not displace from its position when placed over a maternal abdomen. The plurality of the sensors 105-1 through 105-N are coupled with the data acquisition and transmission unit 110. The one or more reference electrodes 120-1 through 120-N and the ground electrode 125-1 are also coupled with the data acquisition and transmission unit 110.

Figure 8:
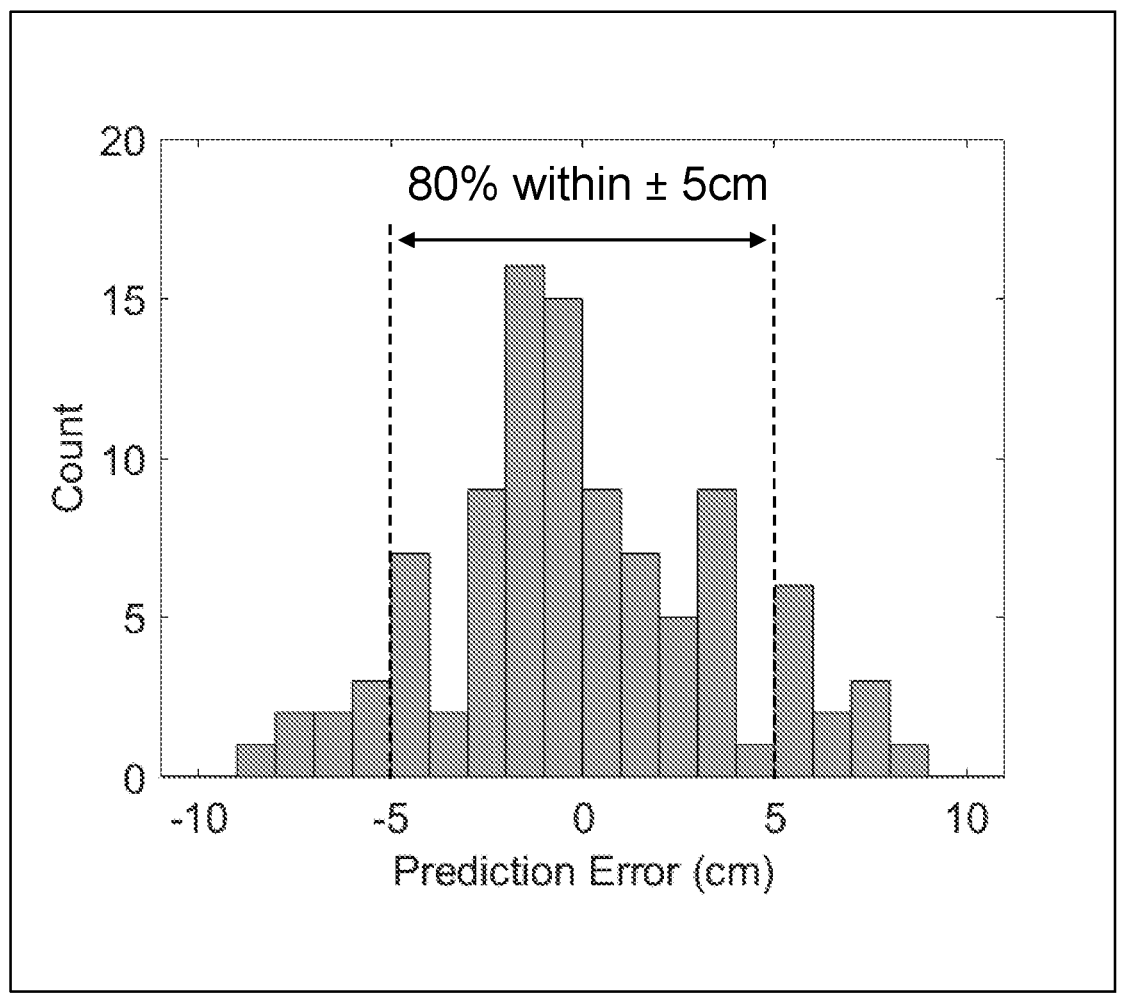
FIG. 8 illustrates an exemplary graphical representation of a prediction error when using maternal height, maternal weight and symphysiofundal height as personal data in a statistical model to predict fetal heart position in relation to the symphysis pubis, in accordance with an embodiment of the present disclosure.

FIG. 8 illustrates an exemplary graphical representation 800 of a prediction error when using maternal height, maternal weight and symphysiofundal height as input features to predict fetal heart position in relation to the symphysis pubis, in accordance with an embodiment of the present disclosure. In one exemplary embodiment, when using the maternal height, maternal weight and symphysiofundal height as input variables in the model to predict the true fetal heart position in relation to the symphysis pubis, the prediction error from the true position in the dataset is shown in FIG. 8. It is observed that 80% of predictions are within +/−5 centimeters of the true position.

Figure 9:
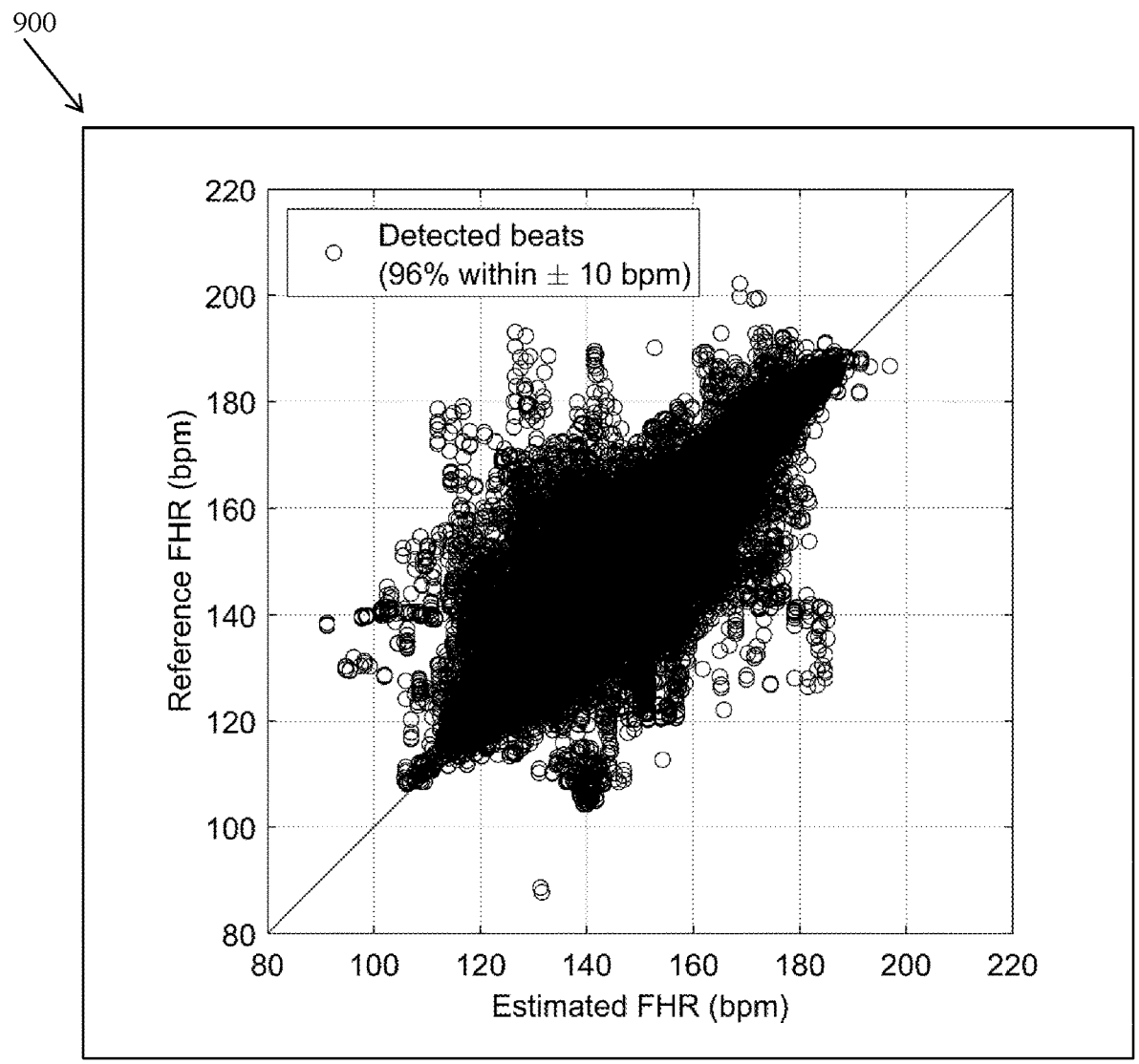
FIG. 9 illustrates an exemplary graphical representation of the fetal heart rate accuracy using the optimal sensor placement and signal quality obtained, in accordance with an embodiment of the present disclosure.

FIG. 9 illustrates an exemplary graphical representation of the fetal heart rate accuracy using the optimal sensor placement and signal quality obtained in accordance with an embodiment of the present disclosure. Using the optimal sensor placement and enhanced signal quality obtained by the method as disclosed herein, fetal heart rate estimates are within +/−10 bpm of the fetal heart rate determined by an ultrasound-based reference measurement 96% of the time as depicted in FIG. 9.

Thus, the embodiments of the present invention provide monitoring of maternal and fetal activities during pregnancy by measuring biological electrical activity and optionally one or more of the following signal modalities: acoustic activity, electromagnetic spectra, movement, temperature or humidity. A plurality of sensors as disclosed herein and a data acquisition device located on the maternal body captures these signals and performs processing before transmitting data to a nearby device such as a computer, phone or tablet. A method for determining optimal sensor locations based on personal anatomic data, patterns of behavior and dynamically assessed signal quality is disclosed. In some situations, upon detecting a feature or signal of interest in the collected data, guidance is communicated to the user in the form of text, symbols, sound, vibrations, images, videos or electromagnetic signals.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

The invention claimed is:

1. A system for achieving optimal placement of a sensor array on a maternal subject's abdomen and enhanced signal quality for monitoring maternal and fetal activities, the system comprising:
   a monitoring device and a computing unit, wherein
   wherein the monitoring device is configured for monitoring maternal and fetal activities, the
   monitoring device comprising:
      a plurality of sensors arranged in a pre-determined layout forming the sensor array comprising the plurality of sensors, one or more reference electrodes and a ground electrode, wherein the sensor array is configured for capturing biological data associated with maternal and fetal activities using one or more signal modalities;
      a data acquisition and transmission unit for processing and transmitting the captured biological data to the computing unit;
   wherein the system is configured for performing a signal quality assessment and selecting the optimal sensors from the plurality of sensors to ensure reliable monitoring of maternal and fetal activities;
   wherein the computing unit is configured to provide guidance to a user for placement of the monitoring device on the maternal abdomen at a determined position and/or provide guidance to improve signal quality, wherein the guidance is provided using an application installed in the computing unit and executed based on:
      one or more subsets of the captured biological data and personal data, and
      at least one of a statistical model and a machine learning model;
   wherein the monitoring device comprises an arrangement where the sensors are arranged in a layout of four sensors between the maternal umbilicus and maternal xiphisternum, and the one or more reference electrodes and the ground electrode are arranged in a layout of three electrodes between the maternal umbilicus and maternal pubis.

2. The system of claim 1, wherein the maternal and fetal activities comprise maternal and fetal electrocardiography (ECG) waveform characteristics, intervals and ratios between maternal and fetal ECG waveform characteristics, fetal heart rate, fetal oxygen saturation, fetal movement, fetal position, fetal orientation, fetal heart position, maternal heart rate, maternal respiratory rate, maternal oxygen saturation, maternal movement, maternal blood pressure, uterine activity, user context, or combinations thereof.

3. The system of claim 1, wherein the captured biological data comprises one or more signals associated with electrical activity, acoustic activity, electromagnetic spectra, movement, temperature and humidity, or combinations thereof.

4. The system of claim 1, wherein the monitoring device comprises an adhesive patch for secured positioning of the monitoring device on the maternal abdomen.

5. The system of claim 1, wherein each of the sensors of the plurality of sensors are coupled to the data acquisition and transmission unit.

6. The system of claim 1, wherein the computing unit comprises an installed application.

7. The system of claim 1, wherein raw signals or intermediary signals captured using the monitoring device are computed on the monitoring device itself.

8. The system of claim 1, wherein the monitoring device is configured to send raw signals or intermediary signals captured using the monitoring device to another device for processing.

9. The system of claim 1, wherein a spatial distance between the plurality of sensors and the one or more reference electrodes or the ground electrode, is a distance from 5 centimeters to 25 centimeters.

10. The system of claim 1, wherein the monitoring device comprises an additional one or more sensors.

11. The system of claim 1, wherein the sensor array comprises wet electrodes connected to a printed circuit board (PCB) via wires or embedded in a flexible material with flexible conductive traces printed on material.

12. The system of claim 1, wherein the sensor array comprises dry or textile-based electrodes of conductive materials interwoven with traditional fibres, coated on traditional fibres, or provided in the form of an electronic tattoo.

13. The system of claim 1, wherein the computing unit is configured to capturing personal data of the user using an application of the computing unit and calculate a position to place the monitoring device close to a fetal heart position.

14. The system of claim 1, wherein the computing unit is configured to determine an initial placement of the monitoring device on the maternal abdomen using at least one of a second statistical model and a second machine learning model to process the captured personal data to predict a fetal heart position.

15. A system for achieving optimal placement of a sensor array on a maternal subject's abdomen and enhanced signal quality for monitoring maternal and fetal activities, the system comprising:
   a monitoring device and a computing unit,
   wherein the monitoring device is configured for monitoring maternal and fetal activities, the monitoring device comprising:
      a plurality of sensors arranged in a pre-determined layout forming the sensor array comprising the plurality of sensors, one or more reference electrodes and a ground electrode, wherein the sensor array is configured for capturing biological data associated with maternal and fetal activities using one or more signal modalities;
      a data acquisition and transmission unit for processing and transmitting the captured biological data to the computing unit;
   wherein the system is configured for performing a signal quality assessment and selecting the optimal sensors to ensure reliable monitoring of maternal and fetal activities; and
   wherein the computing unit is configured for providing guidance to a user for placement of the monitoring device on the maternal abdomen at a determined position or providing guidance to improve signal quality, wherein the guidance is provided using an application installed in the computing unit and executed based on:
      one or more subsets of the captured biological data and personal data, and
      at least one of a statistical model and a machine learning model;
   wherein the personal data comprises maternal height, maternal weight, uterus width, abdominal width, abdominal depth, abdominal circumference, symphysiofundal height, symphysis to umbilicus distance, umbilicus to xiphisternum distance, midline to fundus distance, or combinations thereof.

16. A system for achieving optimal placement of a sensor array on a maternal subject's abdomen and enhanced signal quality for monitoring maternal and fetal activities, the system comprising:
   a monitoring device and a computing unit,
   wherein the monitoring device is configured for monitoring maternal and fetal activities, the monitoring device comprising:
      a plurality of sensors arranged in a pre-determined layout forming the sensor array comprising the plurality of sensors, one or more reference electrodes and a ground electrode, wherein the sensor array is configured for capturing biological data associated with maternal and fetal activities using one or more signal modalities;
      a data acquisition and transmission unit for processing and transmitting the captured biological data to the computing unit;
   wherein the system is configured for performing a signal quality assessment and selecting the optimal sensors to ensure reliable monitoring of maternal and fetal activities;
   wherein the computing unit is configured for providing guidance to a user for placement of the monitoring device on the maternal abdomen at a determined position or providing guidance to improve signal quality, wherein the guidance is provided using an application installed in the computing unit and executed based on:
      one or more subsets of the captured biological data and personal data, and
      at least one of a statistical model and a machine learning model; and
   wherein the one or more reference electrodes and the ground electrode are communicatively coupled with the data acquisition and transmission unit, wherein the system is configured to multiplex an optimal reference electrode for signal acquisition from the one or more reference electrodes based on the signal quality assessment.

\* \* \* \* \*